United States Patent
Mantes et al.

(10) Patent No.: US 11,642,683 B2
(45) Date of Patent: May 9, 2023

(54) POWERED LIQUID SPRAYER

(71) Applicant: MILWAUKEE ELECTRIC TOOL CORPORATION, Brookfield, WI (US)

(72) Inventors: Jonathan M. Mantes, Franklin, WI (US); Daniel Reif, Waukesha, WI (US); Dalton F. Hansen, Whitefish Bay, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 725 days.

(21) Appl. No.: 16/040,320

(22) Filed: Jul. 19, 2018

(65) Prior Publication Data

US 2019/0030554 A1    Jan. 31, 2019

Related U.S. Application Data

(60) Provisional application No. 62/674,720, filed on May 22, 2018, provisional application No. 62/537,754, filed on Jul. 27, 2017.

(51) Int. Cl.
*B05B 9/08* (2006.01)
*B05B 12/00* (2018.01)
(Continued)

(52) U.S. Cl.
CPC ............. *B05B 9/0861* (2013.01); *B05B 9/01* (2013.01); *B05B 9/0888* (2013.01);
(Continued)

(58) Field of Classification Search
CPC . B05B 1/3026; B05B 9/01; B05B 9/04–0406; B05B 9/0413–0423;
(Continued)

(56) References Cited

U.S. PATENT DOCUMENTS 3,901,449 A * 8/1975 Bochmann ............ B05B 9/0861
239/332
4,162,037 A * 7/1979 Koyama ............. B05B 11/3052
222/333
(Continued)

FOREIGN PATENT DOCUMENTS

CN    2207230 Y    9/1995
CN    2351208 Y    12/1999
(Continued)

OTHER PUBLICATIONS

United States Patent Office Action for U.S. Appl. No. 14/378,705 dated Sep. 28, 2017 (10 pages).
(Continued)

*Primary Examiner* — Cody J Lieuwen
(74) *Attorney, Agent, or Firm* — Michael Best & Friedrich LLP

(57) ABSTRACT

A portable, battery-powered liquid sprayer is operable to eject liquids. The sprayer includes a power unit including a base having a motor housed therein. The sprayer further includes a sprayer tank including a reservoir, an outlet fluidly connected with the reservoir, and a pump fluidly connected with the reservoir and the outlet. The sprayer tank is configured for selective engagement with the power unit. When the sprayer tank engages the power unit, the motor is operable to selectively drive the pump to pump liquid from the reservoir for ejection through the outlet.

15 Claims, 22 Drawing Sheets

(51) Int. Cl.
   *B05B 9/01* (2006.01)
   *A01M 7/00* (2006.01)
(52) U.S. Cl.
   CPC ........ *B05B 12/002* (2013.01); *B05B 12/0026* (2018.08); *A01M 7/0021* (2013.01)
(58) Field of Classification Search
   CPC ........ B05B 9/085–0872; B05B 9/0888; B05B 12/002–0026; B05B 12/006; B05B 12/085
   USPC ................. 239/152–154, 373, 525–528, 602
   See application file for complete search history.

(56) References Cited

U.S. PATENT DOCUMENTS

| | | | |
|---|---|---|---|
| 4,187,959 A * | 2/1980 | Pelton | B05B 9/0866 222/105 |
| 4,350,299 A * | 9/1982 | Stephenson | B65D 83/207 222/402.14 |
| 4,553,702 A | 11/1985 | Coffee et al. | |
| 4,801,088 A | 1/1989 | Baker | |
| 5,014,884 A * | 5/1991 | Wunsch | B05B 9/0861 222/333 |
| 5,716,007 A * | 2/1998 | Nottingham | B05B 9/0861 239/332 |
| 5,752,661 A | 5/1998 | Lewis | |
| 6,070,539 A | 6/2000 | Flamme et al. | |
| 6,109,548 A | 8/2000 | George et al. | |
| 6,125,879 A | 10/2000 | Prosper et al. | |
| 6,145,711 A | 11/2000 | Prosper et al. | |
| 7,007,826 B2 | 3/2006 | Shapanus et al. | |
| D591,387 S | 4/2009 | Campbell | |
| D594,087 S | 6/2009 | Campbell | |
| 8,141,754 B2 | 3/2012 | Conner et al. | |
| 8,556,192 B2 | 10/2013 | Wise | |
| 8,672,364 B2 | 3/2014 | Schrum et al. | |
| 8,985,482 B1 | 3/2015 | Schrum et al. | |
| D749,192 S | 2/2016 | Fontaine | |
| 9,296,002 B2 | 3/2016 | Zwahlen et al. | |
| D780,291 S | 2/2017 | Schrum et al. | |
| 2003/0173420 A1* | 9/2003 | Hanson | B05B 9/0861 239/337 |
| 2003/0201340 A1 | 10/2003 | Hanson | |
| 2004/0211792 A1* | 10/2004 | Vitantonio | B05B 9/0861 222/333 |
| 2004/0217137 A1 | 11/2004 | Ophardt | |
| 2007/0125878 A1* | 6/2007 | Hahn | B08B 3/026 239/332 |
| 2007/0278326 A1* | 12/2007 | Wu | B05B 9/0861 239/302 |
| 2007/0284461 A1 | 12/2007 | Alexander et al. | |
| 2009/0269218 A1 | 10/2009 | Gardner et al. | |
| 2015/0050169 A1 | 2/2015 | Horie et al. | |
| 2015/0102121 A1* | 4/2015 | Dey | B05B 7/32 239/1 |
| 2015/0258558 A1 | 9/2015 | Schrum et al. | |
| 2016/0016207 A1 | 1/2016 | Horie et al. | |
| 2016/0038960 A1* | 2/2016 | Fontaine | B05B 9/0861 239/332 |
| 2019/0224703 A1 | 7/2019 | Gustafson et al. | |

FOREIGN PATENT DOCUMENTS

| | | |
|---|---|---|
| CN | 2514928 Y | 10/2002 |
| CN | 2571504 Y | 9/2003 |
| CN | 2770802 Y | 4/2006 |
| CN | 2820335 Y | 9/2006 |
| CN | 2923053 Y | 7/2007 |
| CN | 101032711 A | 9/2007 |
| CN | 201040272 Y | 3/2008 |
| CN | 201067722 Y | 6/2008 |
| CN | 201070609 Y | 6/2008 |
| CN | 201088941 Y | 7/2008 |
| CN | 201124136 Y | 10/2008 |
| CN | 101439327 A | 5/2009 |
| CN | 201267792 Y | 7/2009 |
| CN | 201632357 U | 11/2010 |
| CN | 201684691 U | 12/2010 |
| CN | 203209349 U | 9/2013 |
| CN | 103586157 A | 2/2014 |
| CN | 203578080 U | 5/2014 |
| CN | 203695273 U | 7/2014 |
| CN | 104338634 A | 2/2015 |
| CN | 204148042 U | 2/2015 |
| CN | 204448363 U | 7/2015 |
| CN | 204602482 U | 9/2015 |
| CN | 205128247 U | 4/2016 |
| CN | 205462858 U | 8/2016 |
| CN | 205587190 U | 9/2016 |
| CN | 205587194 U | 9/2016 |
| CN | 106179825 A | 12/2016 |
| CN | 205966242 U | 2/2017 |
| CN | 206343309 U | 7/2017 |
| DE | 102012214712 A1 | 2/2014 |
| EP | 2594337 A1 | 5/2013 |
| GB | 2438713 A | 12/2007 |
| JP | H01152748 U | 10/1989 |
| JP | H06041652 Y2 | 11/1994 |
| JP | 3734410 B2 | 1/2006 |
| JP | 4097199 B2 | 6/2008 |
| JP | 4181474 B2 | 11/2008 |
| JP | 2014147356 A | 8/2014 |
| JP | 2015122972 A | 7/2015 |
| JP | 2015136649 A | 7/2015 |
| JP | 6081809 B2 | 2/2017 |
| WO | 2001/92723 A1 | 12/2001 |
| WO | 2011062986 A1 | 5/2011 |
| WO | 2011062992 A1 | 5/2011 |
| WO | 2013/014873 A1 | 1/2013 |
| WO | 2015/164934 A1 | 11/2015 |
| WO | 2016/210450 A1 | 12/2016 |

OTHER PUBLICATIONS

International Search Report and Written Opinion for Application No. PCT/US2018/042947 dated Oct. 31, 2018, 16 pages.
Partial Supplementary European Search Report for Application No. 18838428.3 dated Mar. 17, 2021 (18 pages).

* cited by examiner

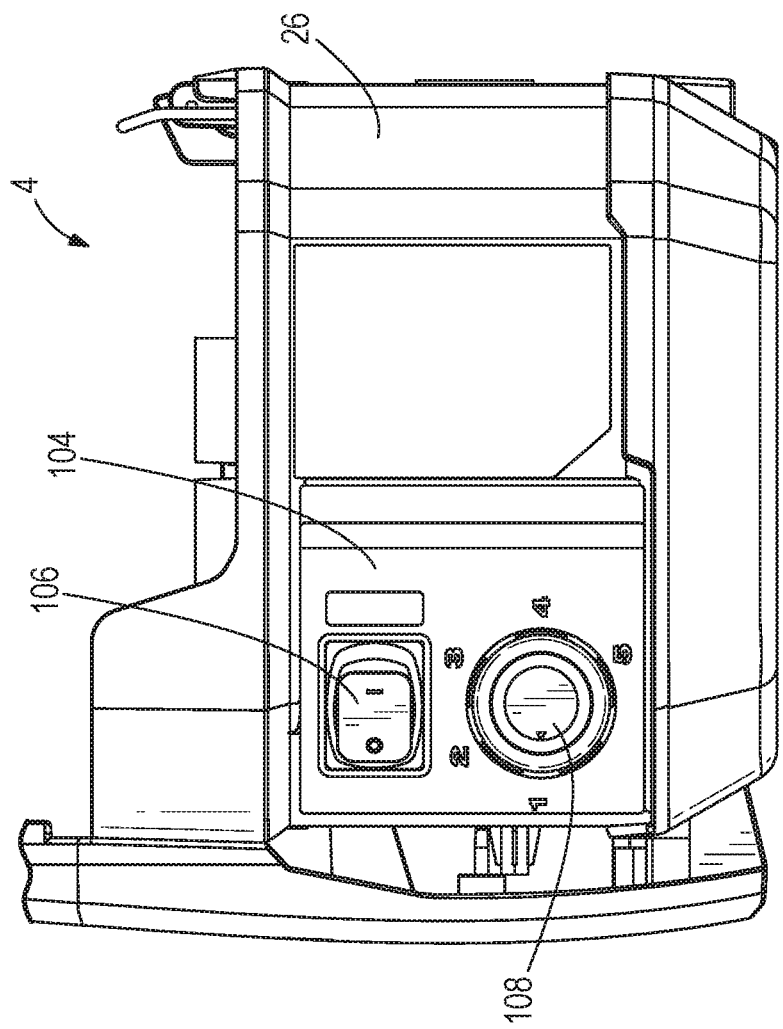
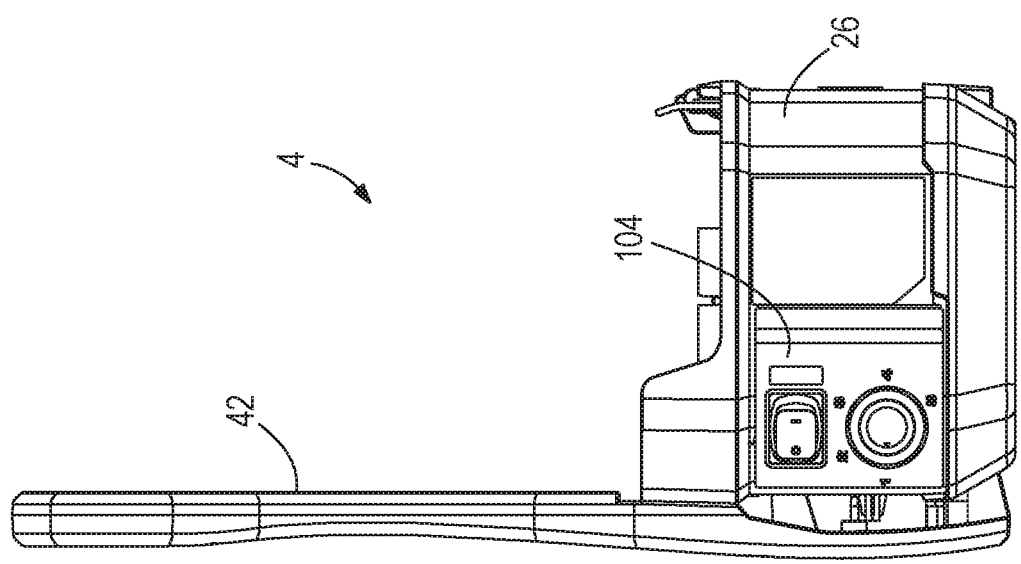
FIG. 13
FIG. 12

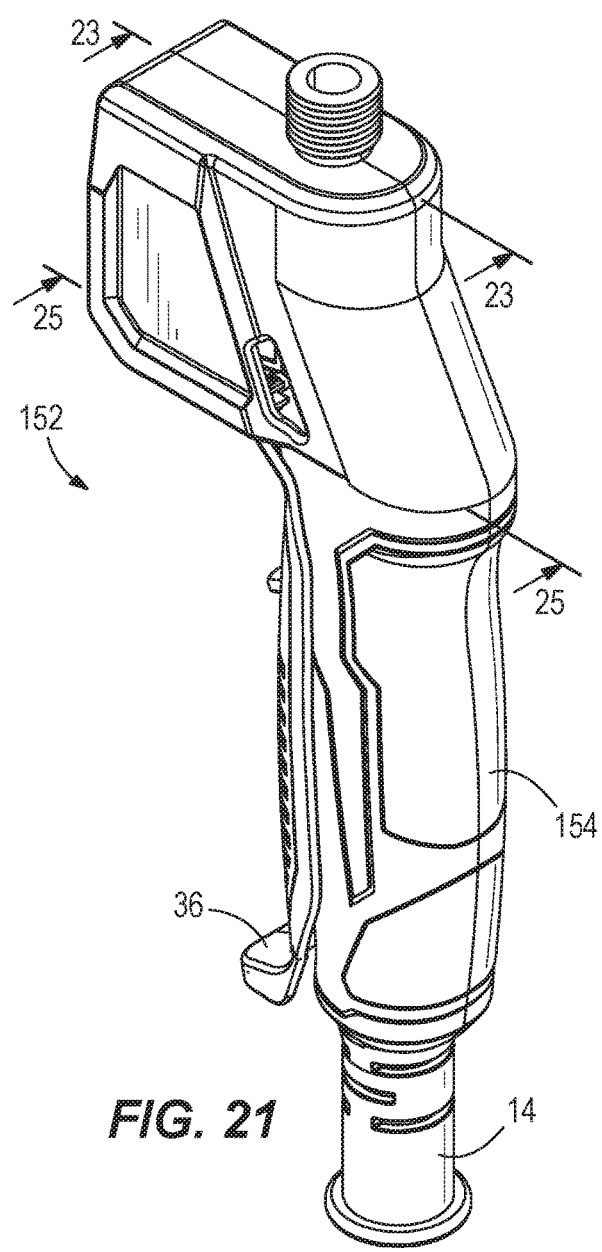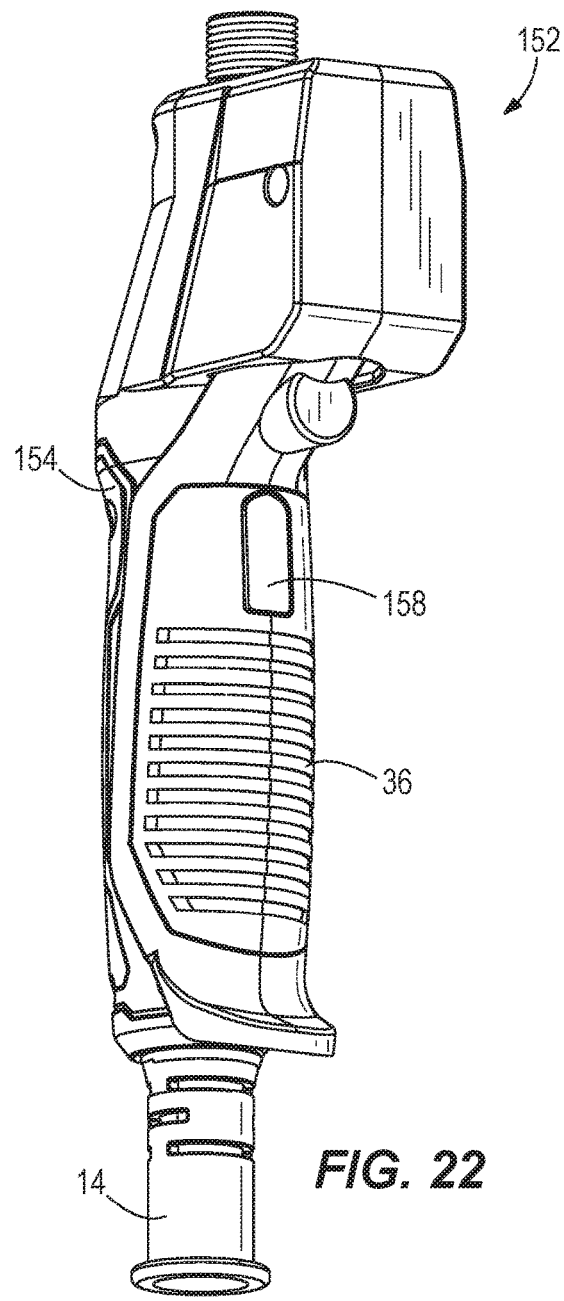

POWERED LIQUID SPRAYER

CROSS-REFERENCE TO RELATED APPLICATIONS

This application claims priority to co-pending U.S. Provisional Patent Application No. 62/537,754, filed on Jul. 27, 2017, and to co-pending U.S. Provisional Patent Application No. 62/674,720, filed on May 22, 2018, the entire contents of which are incorporated herein by reference.

FIELD OF THE INVENTION

The present invention relates generally to liquid sprayers, and more specifically to portable battery-powered liquid sprayers.

BACKGROUND OF THE INVENTION

Powered liquid sprayers are typically used to apply large amounts of liquid (e.g., pesticides, herbicides, fungicides, insecticides, fertilizers, etc.) to targeted areas for grounds maintenance, supporting crop growth, pest control, etc. Some sprayers include multiple interchangeable sprayer tanks that contain different chemicals. The pumps, hoses, and other internal components of sprayers typically need to be cleaned or flushed between uses to avoid cross-contamination.

Moreover, water tanks are typically used for concrete cutting and coring applications to provide water to the application to cool down the blade or bit and suppress dust created from the cutting material. Typical water tanks are not powered and instead operate via manual pumps or gravity feed. Moreover, typical sprayers do not interface with cut-off saws and core drills to supply water for cutting and coring applications.

Additionally, powered liquid sprayers are also used to apply concrete chemicals (e.g., curing and sealing chemicals, etcher, form oil, muriatic acid, xylene, etc.) to concrete for cleaning, etching, form release, curing, sealing, etc. Some concrete chemical sprayers include multiple interchangeable sprayer tanks that contain different concrete chemicals. The pumps, hoses, and other internal components of concrete chemical sprayers typically need to be cleaned or flushed between uses to avoid cross-contamination.

SUMMARY OF THE INVENTION

The present invention provides, in one aspect, a portable, battery-powered liquid sprayer for ejecting liquids. The sprayer includes a power unit including a base having a motor housed therein. The sprayer also includes a sprayer tank including a reservoir, an outlet fluidly connected with the reservoir, and a pump fluidly connected with the reservoir and the outlet. The sprayer tank is configured for selective engagement with the power unit. When the sprayer tank engages the power unit, the motor is operable to selectively drive the pump to pump liquid from the reservoir for ejection through the outlet.

The present invention provides, in another aspect, a portable, battery-powered liquid sprayer for ejecting liquids. The sprayer includes a power unit including a base. The sprayer also includes a first sprayer tank and a second sprayer tank. Each of the first and second sprayer tanks includes a reservoir, an outlet fluidly connected with the reservoir, and a pump fluidly connected with the reservoir and the outlet. Each of the first sprayer tank and the second sprayer tank is configured for selective engagement with the power unit.

The present invention provides, in another aspect, a portable, battery-powered liquid sprayer for ejecting liquids. The sprayer includes a reservoir, a pump in fluid communication with the reservoir, a motor operable to selectively drive the pump, and a wand in fluid communication with the pump. The wand includes a mechanical valve in fluid communication with the pump, the mechanical valve being configured to inhibit the flow of liquid when closed and to permit the flow of liquid when open. The wand also includes a switch configured to selectively activate the motor, the motor being activated when the switch is closed and being deactivated when the switch is open. The wand also includes an actuator operable to actuate the mechanical valve and the switch, the actuator being movable between a first position, a second position, and a third position. In the first position, the mechanical valve is closed such that the flow of liquid is inhibited by the mechanical valve, and the switch is open such that the motor is deactivated. In the second position, the mechanical valve is open such that the flow of liquid is permitted by the mechanical valve, and the switch is open such that the motor is deactivated. In the third position, the mechanical valve is open such that the flow of liquid is permitted by the mechanical valve, and the switch is closed such that the motor is activated.

Other features and aspects of the invention will become apparent by consideration of the following detailed description and accompanying drawings.

BRIEF DESCRIPTION OF THE DRAWINGS

FIG. 12 is a first side view of the power unit of the powered sprayer of FIG. 1

FIG. 13 is a detail first side view of the power unit of the powered sprayer of FIG. 1, illustrating a recessed control panel

FIG. 21 is a rear perspective view of a wand handle of the powered sprayer of FIG. 1.

FIG. 22 is a front perspective view of the wand handle of the powered sprayer of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
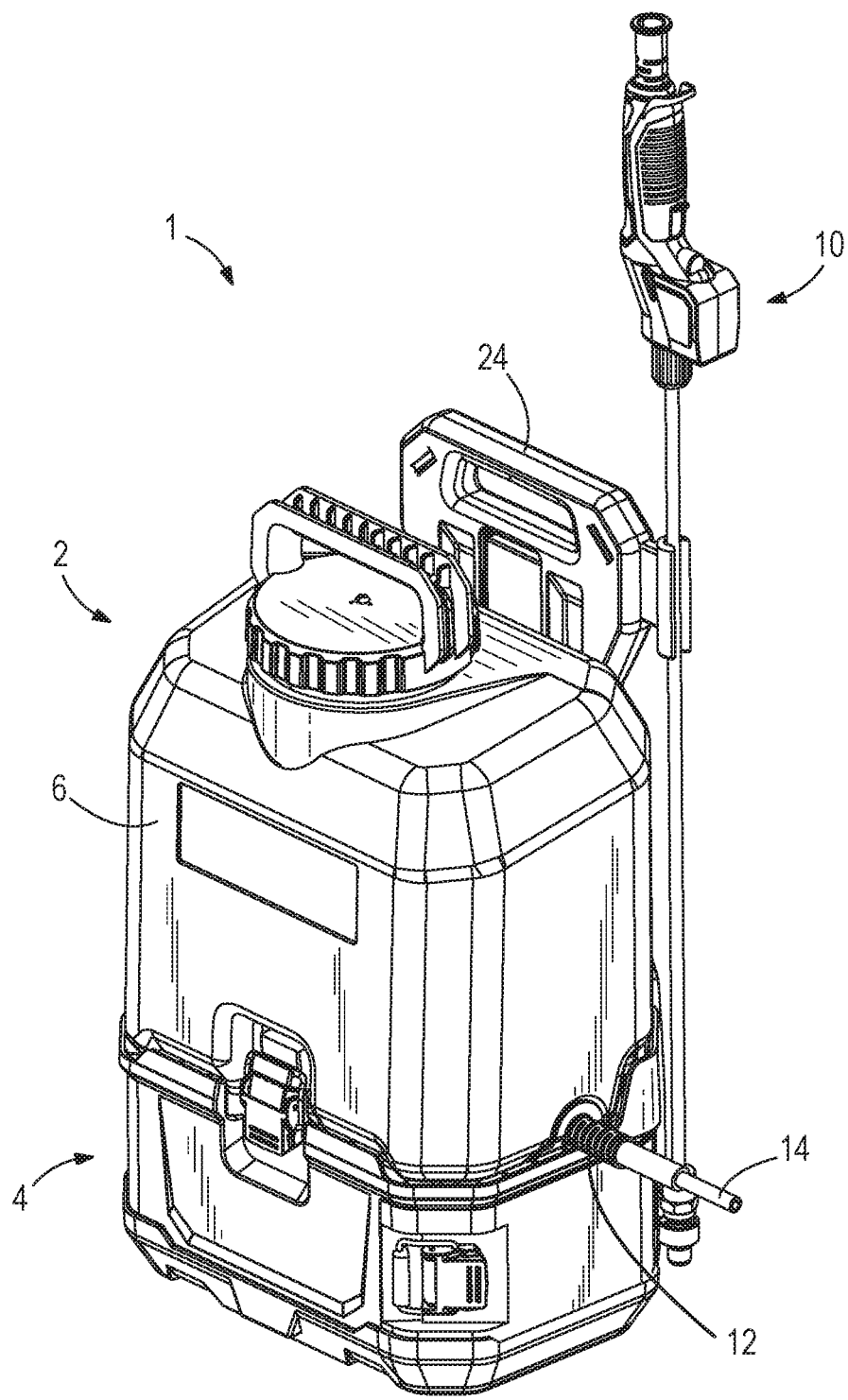
FIG. 1 is a perspective view of a powered sprayer operable with each of a sprayer tank and a water tank in accordance with an embodiment of the invention.
Figure 20:
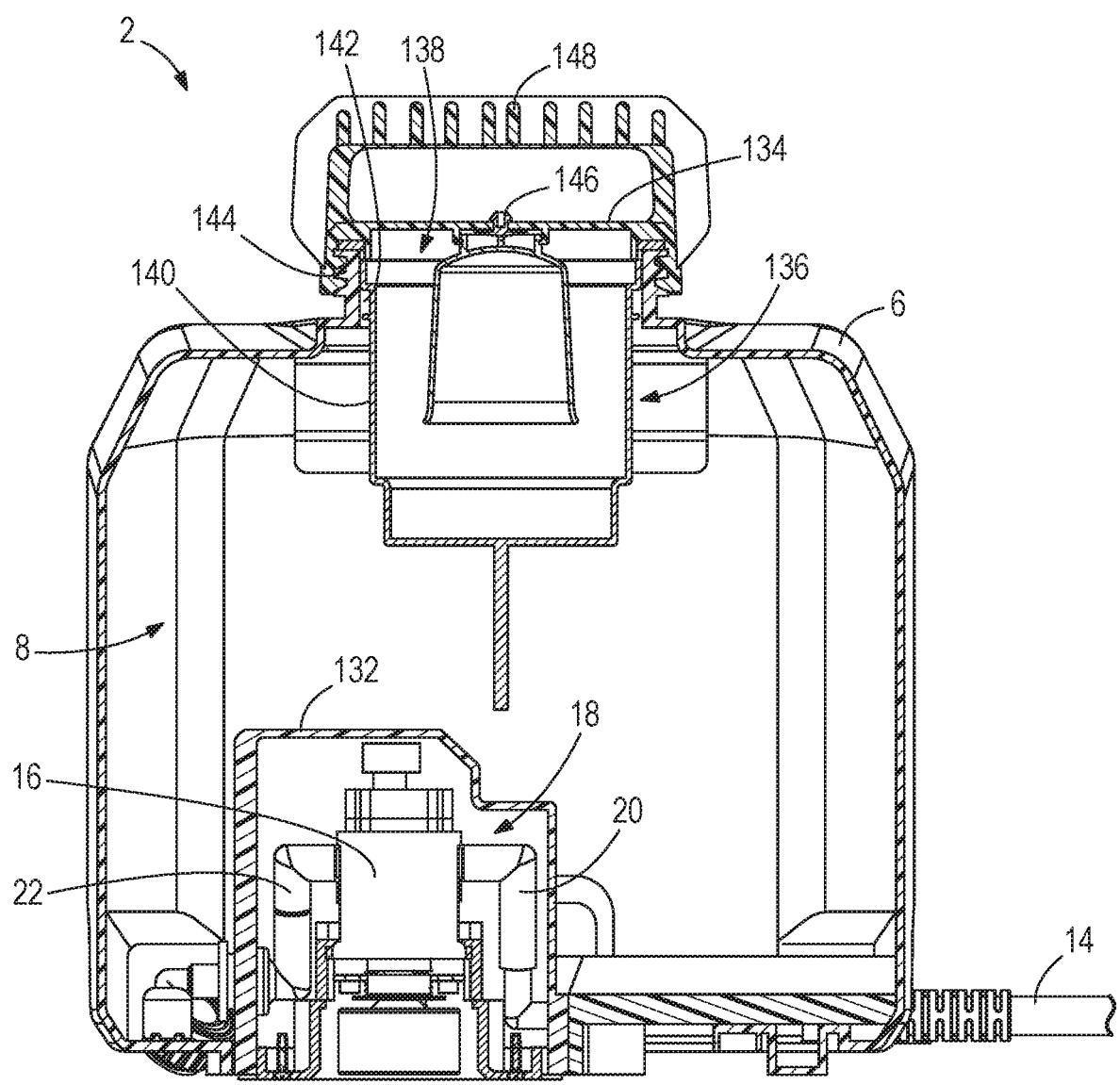
FIG. 20 is a front cross-sectional view of the sprayer tank of the powered sprayer of FIG. 1, taken along line 20-20 of FIG. 19.

FIG. 1 illustrates a powered liquid sprayer 1 including a sprayer tank 2 that is removably coupled to a power unit 4 in accordance with an embodiment of the invention. The sprayer tank 2 includes a reservoir 6 defining a tank compartment 8 (FIG. 20), which may contain a liquid such as, but not limited to, an herbicide, a pesticide, etc. The sprayer tank 2 also includes a wand 10 fluidly connected to a tank outlet 12 via a hose 14 (FIG. 1), and a pump 16 (FIGS. 4-7) disposed beneath the tank compartment 8 in a pump compartment 18 (FIG. 20). The pump compartment 18 is fluidly isolated from the tank compartment 8. In the illustrated embodiment, the pump 16 is a dual diaphragm pump. In other embodiments, the pump 16 may be a piston pump, a plunger pump, etc. An outlet 20 (FIG. 20) of the pump 16 is fluidly connected to the hose 14, whereas an inlet 22 of the pump 16 is in fluid communication with the tank compartment 8 to draw liquid therefrom. The power unit 4 also includes a power unit handle 24 (FIG. 1) to facilitate transport of the sprayer 1 when the sprayer tank 2 and the power unit 4 are attached.

Figure 15:
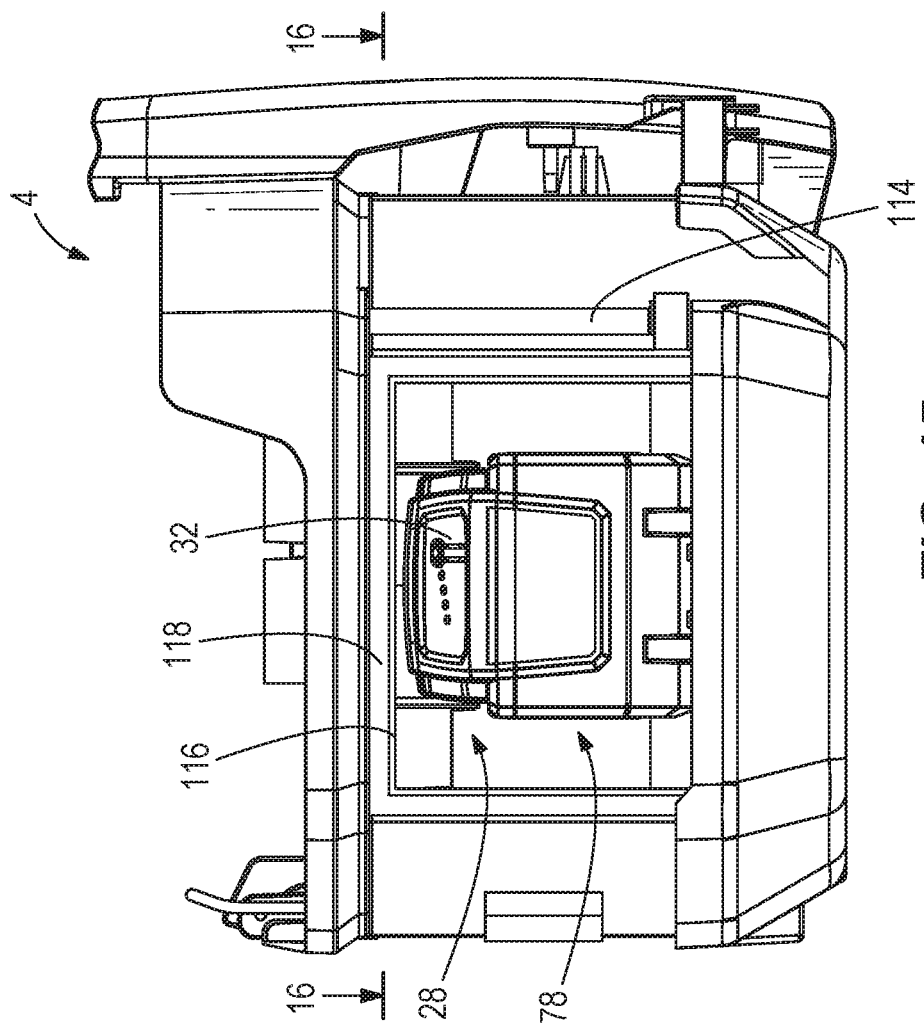
FIG. 15 is a detail second side view of the power unit of the powered sprayer of FIG. 1, illustrating a removable and rechargeable battery supported within a base compartment.
Figure 14:
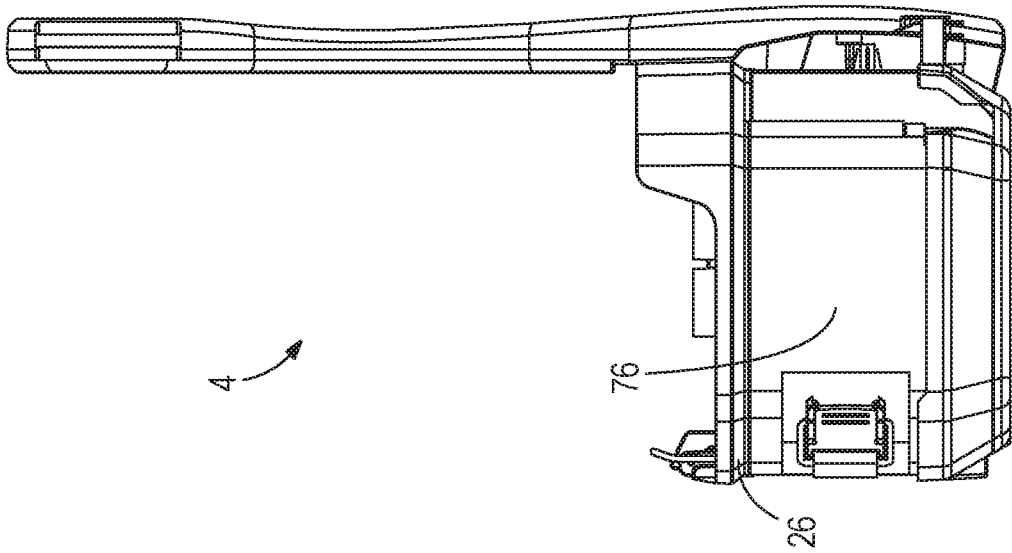
FIG. 14 is a second side view of the power unit of the powered sprayer of FIG. 1
Figure 16:
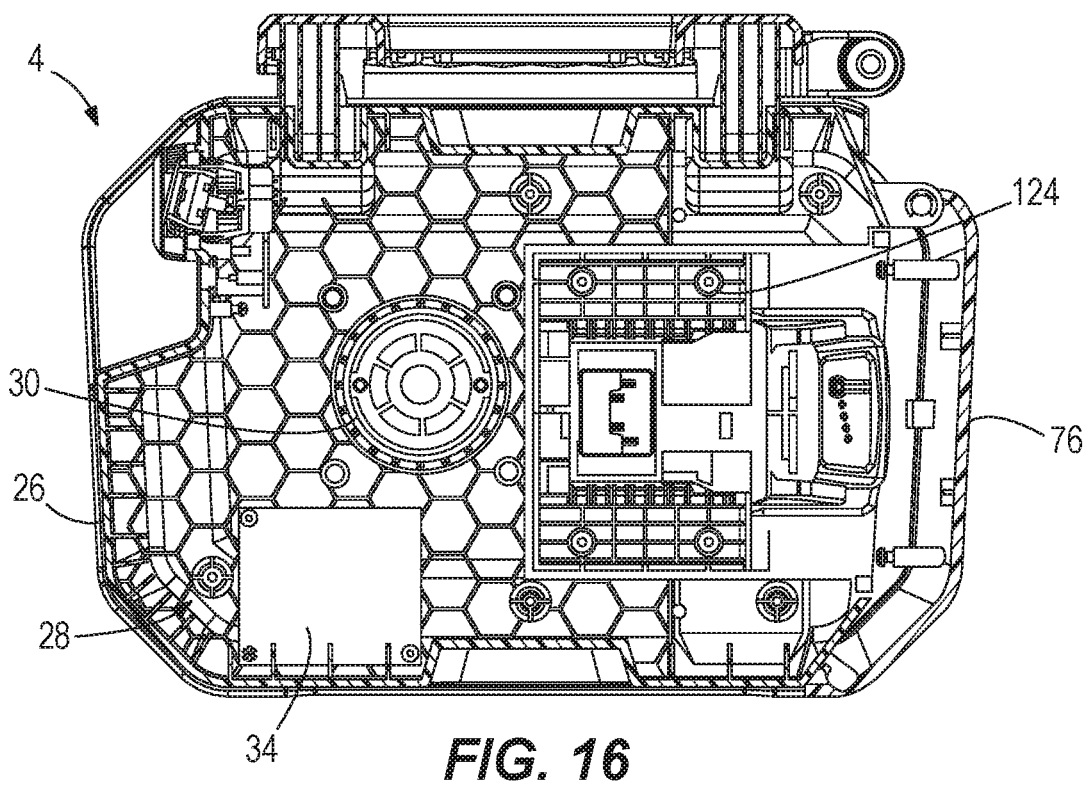
FIG. 16 is a top cross-sectional view of the power unit of the powered sprayer of FIG. 1, taken along line 16-16 of FIG. 15 and illustrating a motor and a battery pack fixing base housed within the base compartment.
Figure 17:
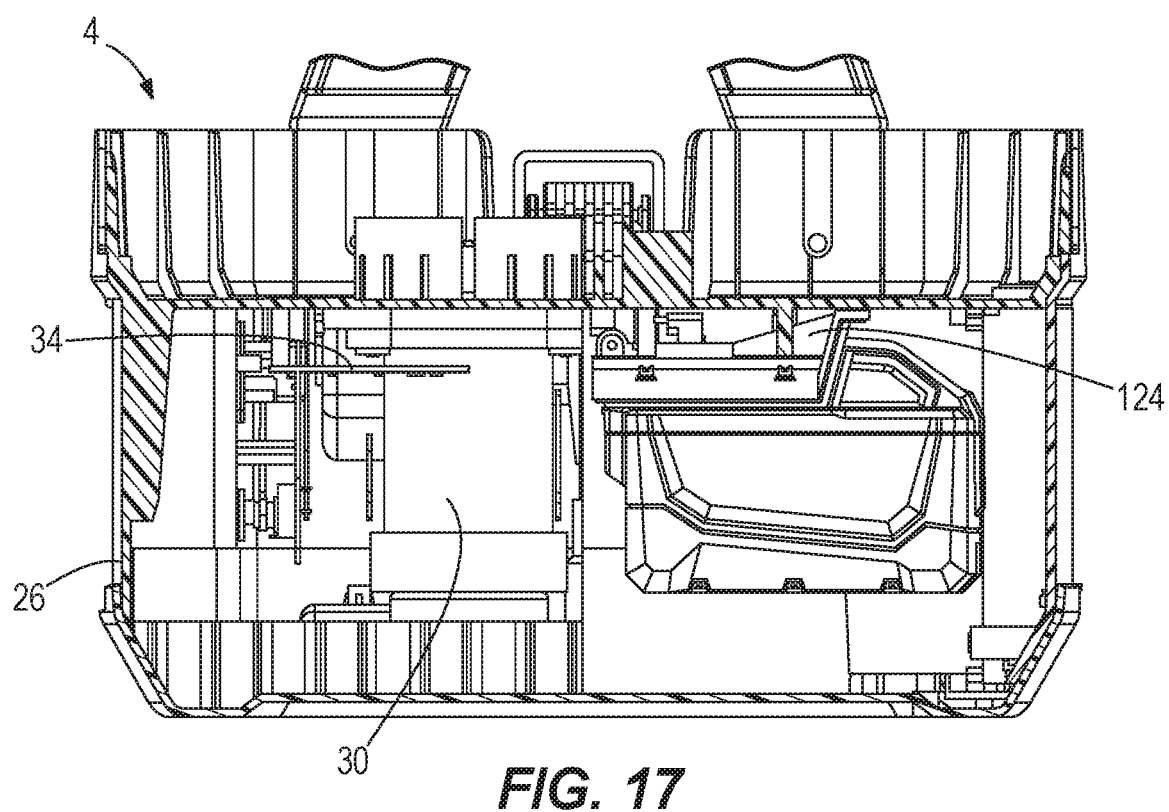
FIG. 17 is a front cross-sectional view of the power unit of the powered sprayer of FIG. 1, taken along line 17-17 of FIG. 9.

With reference to FIGS. 15-17, the power unit 4 includes a base 26 defining a base compartment 28 that contains a motor 30 and a removable power tool battery pack 32. The power unit 4 also includes a controller, such a printed circuit board assembly (PCBA) 34, for controlling activation and deactivation of the motor 30 in response to a user depressing a trigger 36 (FIG. 22) on the wand 10.

Figure 10:
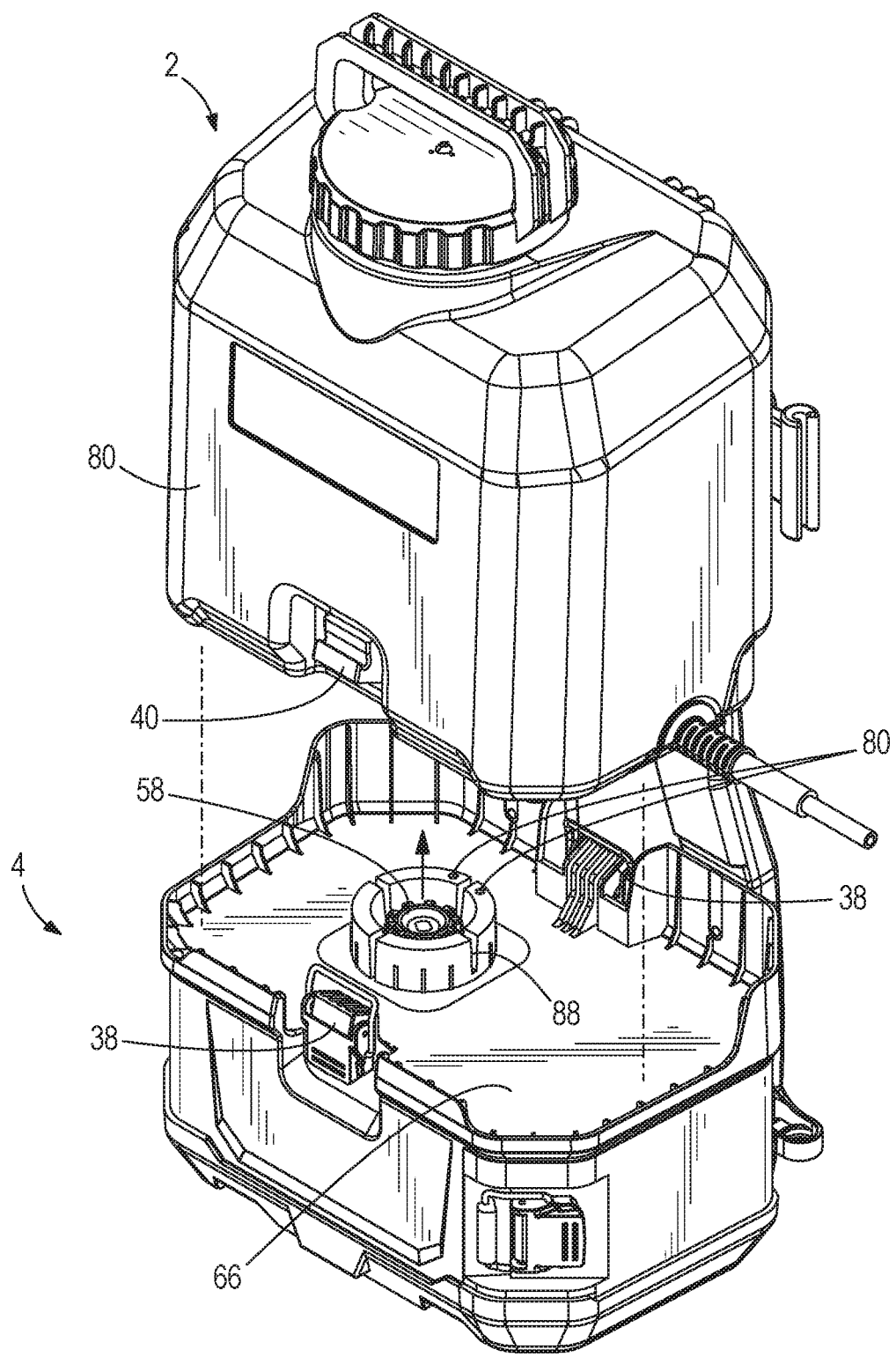
FIG. 10 is another perspective view of the powered sprayer of FIG. 1.
Figure 11:
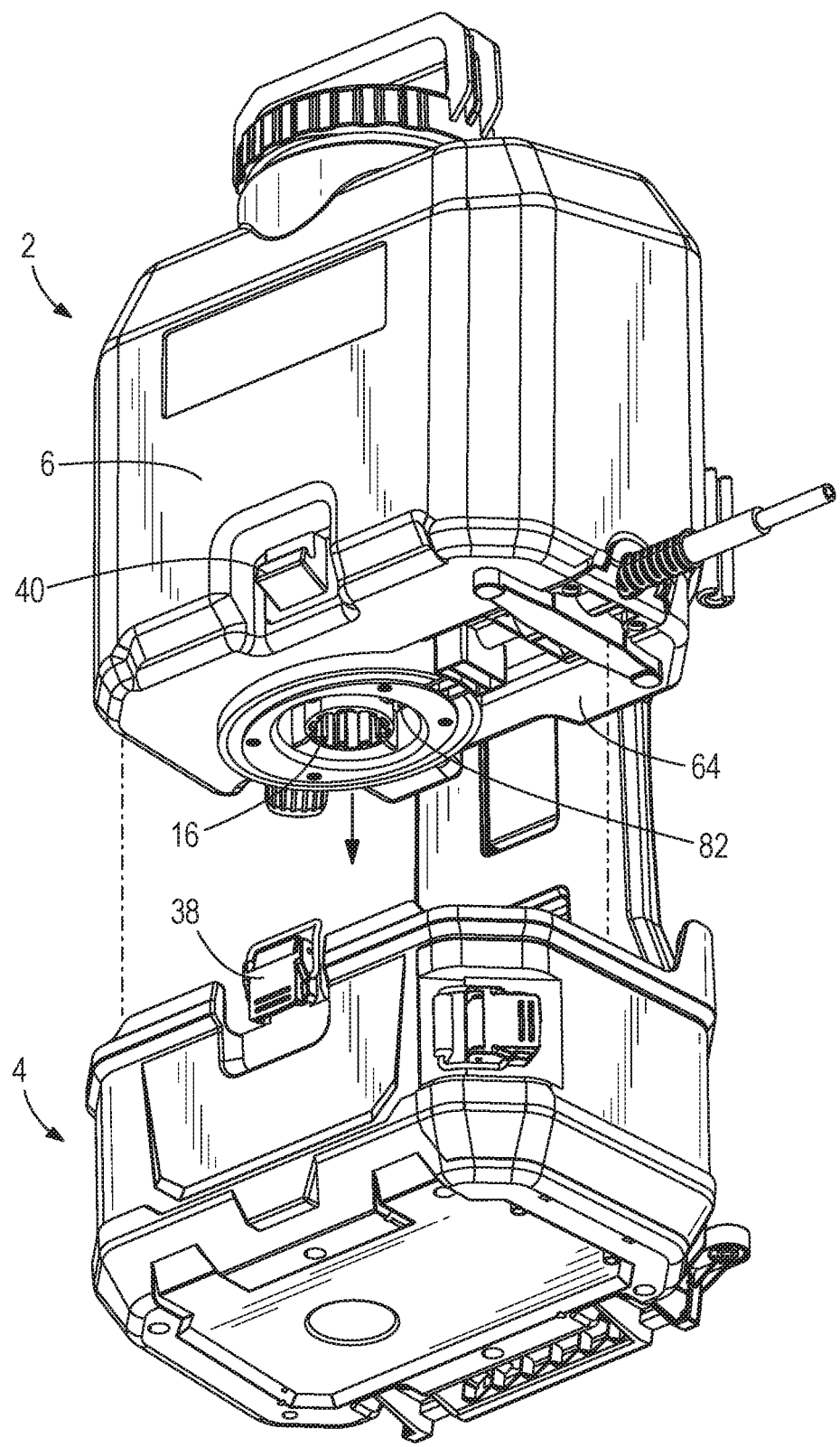
FIG. 11 is another perspective view of the powered sprayer of FIG. 1.

With reference to FIGS. 10 and 11, the sprayer 1 also includes tank latches 38 located at each of the front and the back of the power unit 4. The tank latches 38 are configured to engage integrally formed tank catches 40 located on the sprayer tank 2 to facilitate attaching and removing the sprayer tank 2 to/from the power unit 4 without requiring tools to be used.

The power unit 4 of the powered sprayer 1 may be interchangeably coupled to multiple sprayer tanks 2. For example, a first sprayer tank 2 containing a first liquid (e.g., pesticide) can quickly and easily be removed from the power unit 4, and replaced with a second sprayer tank 2 containing a second liquid (e.g., herbicide). As will be discussed further below, when the sprayer tank 2 of the present invention is attached to the power unit 4, the sprayer tank 2 is mechanically but not fluidly coupled to the power unit 4. Thus, multiple sprayer tanks 2 can quickly be interchanged without the need to clean or purge the fluid lines (e.g., inlet 22, outlet 20, hose 14, etc.) of the powered sprayer 1.

Figure 2:
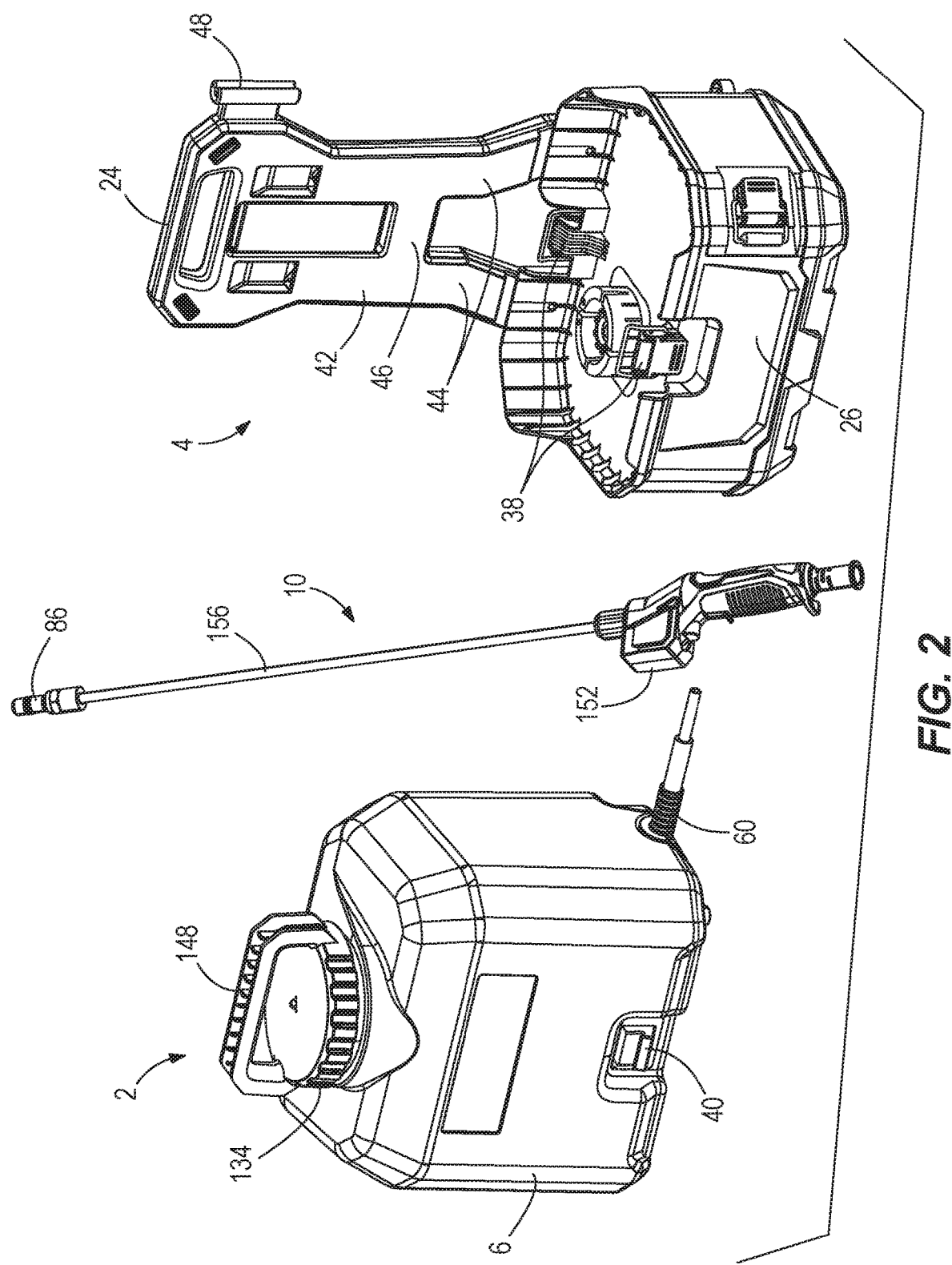
FIG. 2 is a perspective view of a sprayer tank, a wand, and a power unit of the powered sprayer of FIG. 1.

With reference to FIG. 2, a back frame 42 is fixedly secured to a rear side of the base 26 of the power unit 4. The frame 42 includes a pair of generally parallel vertical frame members 44 fixed together via horizontal cross members 46. An uppermost cross member 46 forms the power unit handle 24. A wand clip 48 projects laterally from the frame 42 adjacent the tank outlet 12 and selectively receives the wand 10 for convenient storage and transportation when the sprayer 1 is not in use.

Figure 3:
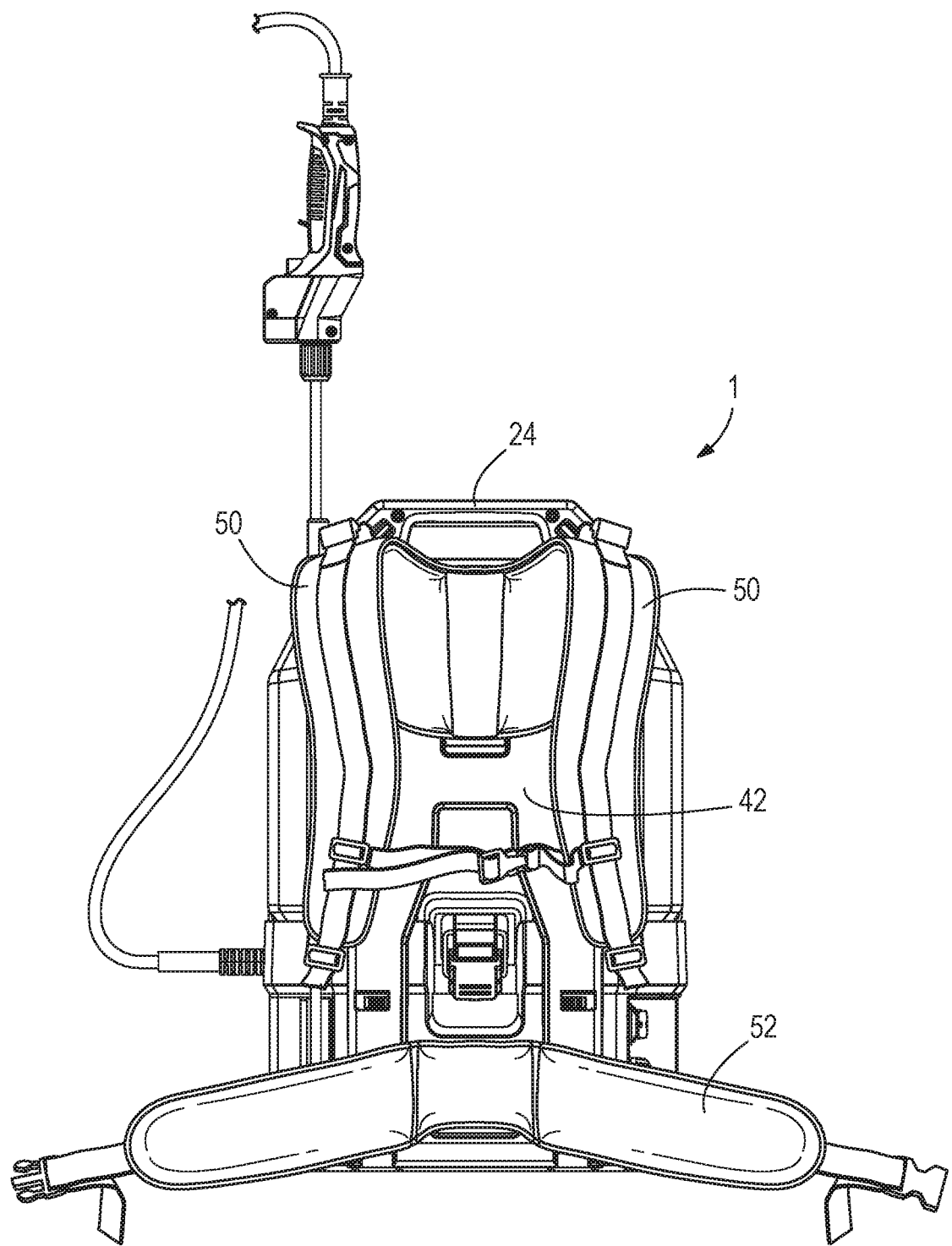
FIG. 3 is a rear view of the powered sprayer of FIG. 1, illustrating shoulder and waist straps wearable to secure the powered sprayer to a user's back.

With reference to FIG. 3, the power unit 4 includes shoulder straps 50 and a waist strap 52 removably attached to the frame 42. The shoulder and waist straps 50, 52 permit the sprayer 1 to be carried and worn by a user during operation.

With reference to FIGS. 4-7, the sprayer 1 includes a pump/motor interface assembly 54 drivably coupling the motor 30 to the pump 16 when the sprayer tank 2 is attached to the power unit 4. The pump/motor interface assembly 54 includes a first coupling 56 connected to a rotational input shaft of the pump 16 and a second coupling 58 connected to a rotational output shaft of the motor 30. The first and second couplings 56, 58 include mating features, such as radially extending teeth 60, 62 (FIGS. 6 and 7), which when engaged rotationally unitize the couplings 56, 58 in at least one direction of rotation. The first coupling 56 is exposed on a tank mating surface 64 (FIG. 11) of the sprayer tank 2, whereas the second coupling 58 is exposed on a base mating surface 66 of the power unit 4 (FIG. 10). In this manner, when the sprayer tank 2 and the power unit 4 are connected, the couplings 56, 58 are axially aligned and engaged with each other to permit torque to be transferred from the motor 30 to the pump 16 when the motor 30 is activated.

In other embodiments (not shown), in lieu of the radially extending teeth 60, 62, the present invention may include alternative mating features for coupling the first and second couplings 56, 58. For example, in some embodiments, the first coupling 56 may include pin recesses (not shown) that receive corresponding, axially extending pins (not shown) located on the second coupling 58. In further embodiments, the first coupling 56 may include a polygonal recess (e.g., triangular, rectangular, hexagonal, etc.; not shown) that receives a corresponding polygonal key (not shown) located on the second coupling 58.

Figure 4:
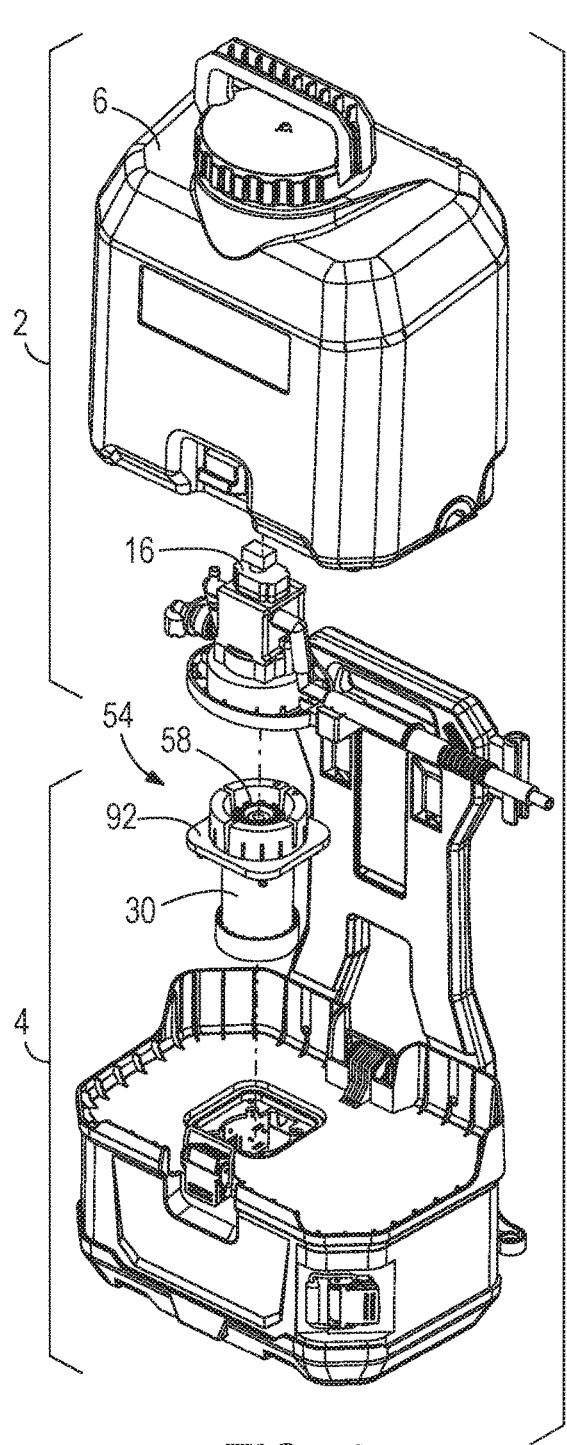
FIG. 4 is a partially exploded top perspective view of the powered sprayer of FIG. 1.
Figure 5:
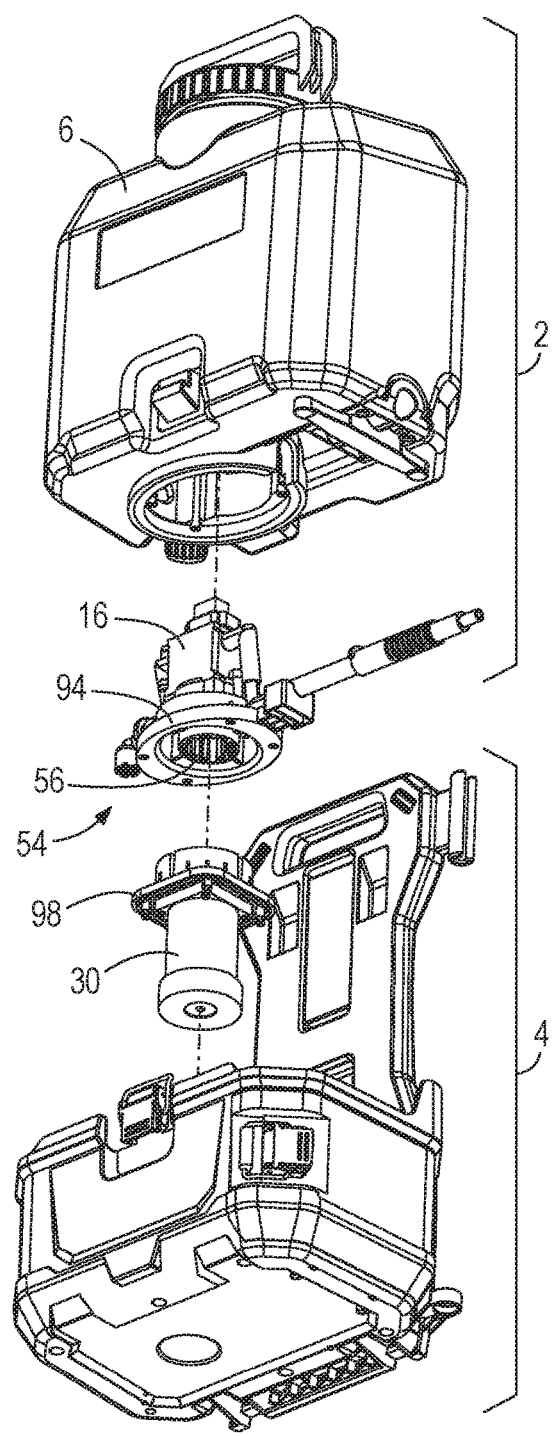
FIG. 5 is a partially exploded bottom perspective view of the powered sprayer of FIG. 1.
Figure 6:
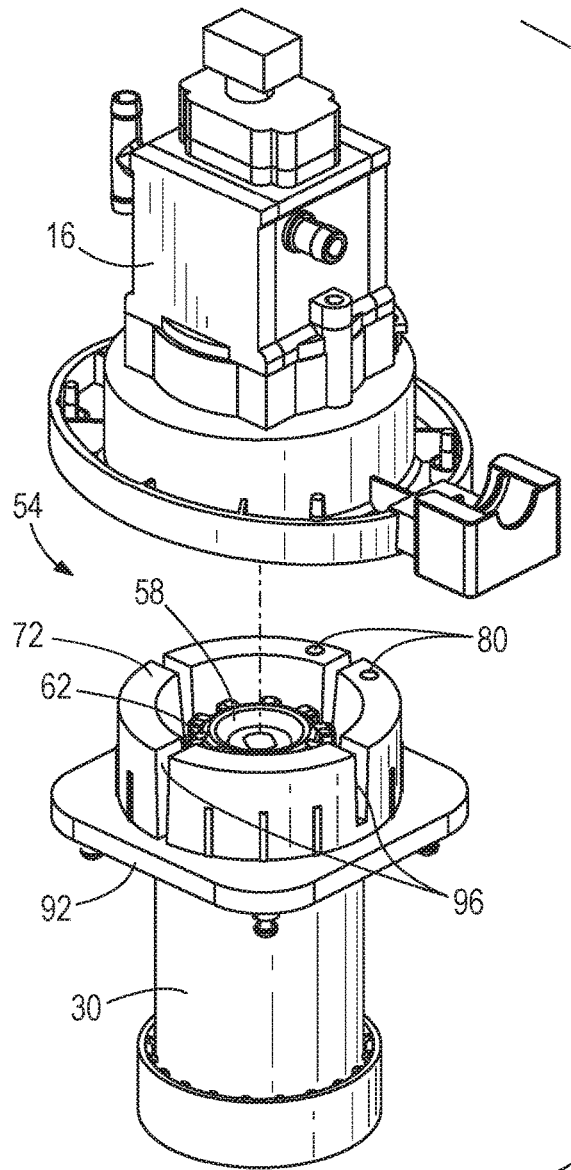
FIG. 6 is a top perspective view of an interface plate assembly of the powered sprayer of FIG. 1.
Figure 7:
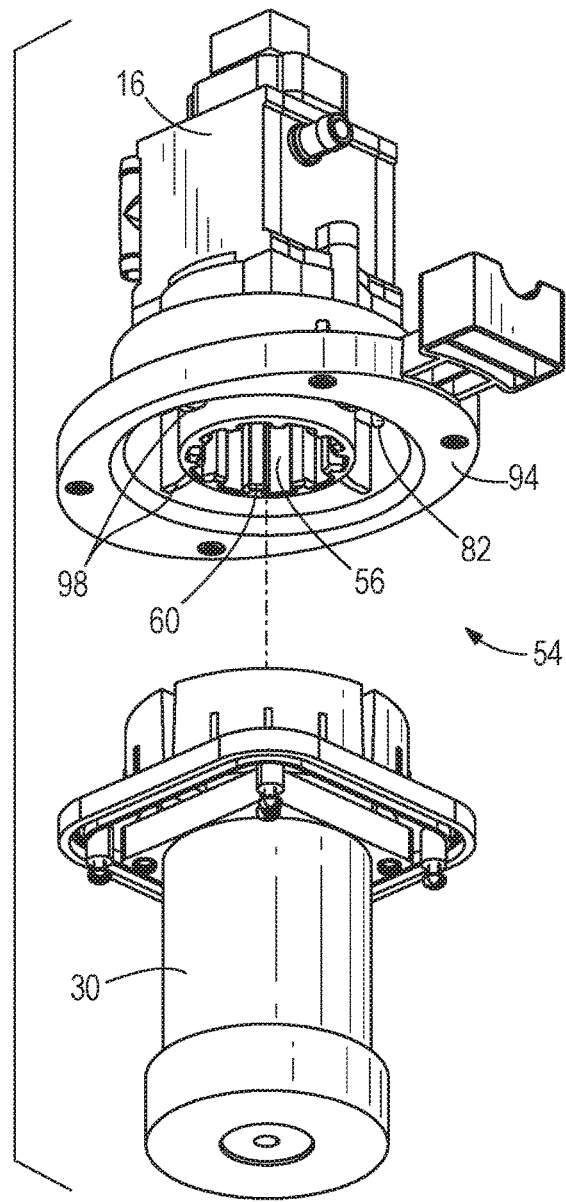
FIG. 7 is a bottom perspective view of the interface plate assembly of FIG. 6.

FIGS. 6 and 7 illustrate enlarged views of the couplings 56, 58 shown in FIGS. 4 and 5. The first coupling 56 is configured as a hollow cylindrical hub having the radially extending teeth 60 protruding radially inward from an interior surface of the hub. The second coupling 58 is configured as a cylindrical pinion having radially extending teeth 62 protruding radially outward from an exterior surface of the pinion. The respective teeth 60, 62 on the couplings 56, 58 are arranged in a circular array about a rotational axis of the couplings 56, 58, ensuring alignment of the teeth 60, 62 when the couplings 56, 58 are aligned and engaged as described above. In other embodiments, the couplings may alternatively be configured as generally flat plates having axially extending teeth.

The base mating surface 66 mates with the tank mating surface 64 (FIGS. 10 and 11) when the sprayer tank 2 is coupled to the power unit 4. A peripheral wall 68 (FIG. 8) circumscribes the base mating surface 66. The peripheral wall 68 serves to roughly align the sprayer tank 2 with the power unit 4 and further supports the sprayer tank 2 when the sprayer tank 2 is coupled to the power unit 4.

Figure 8:
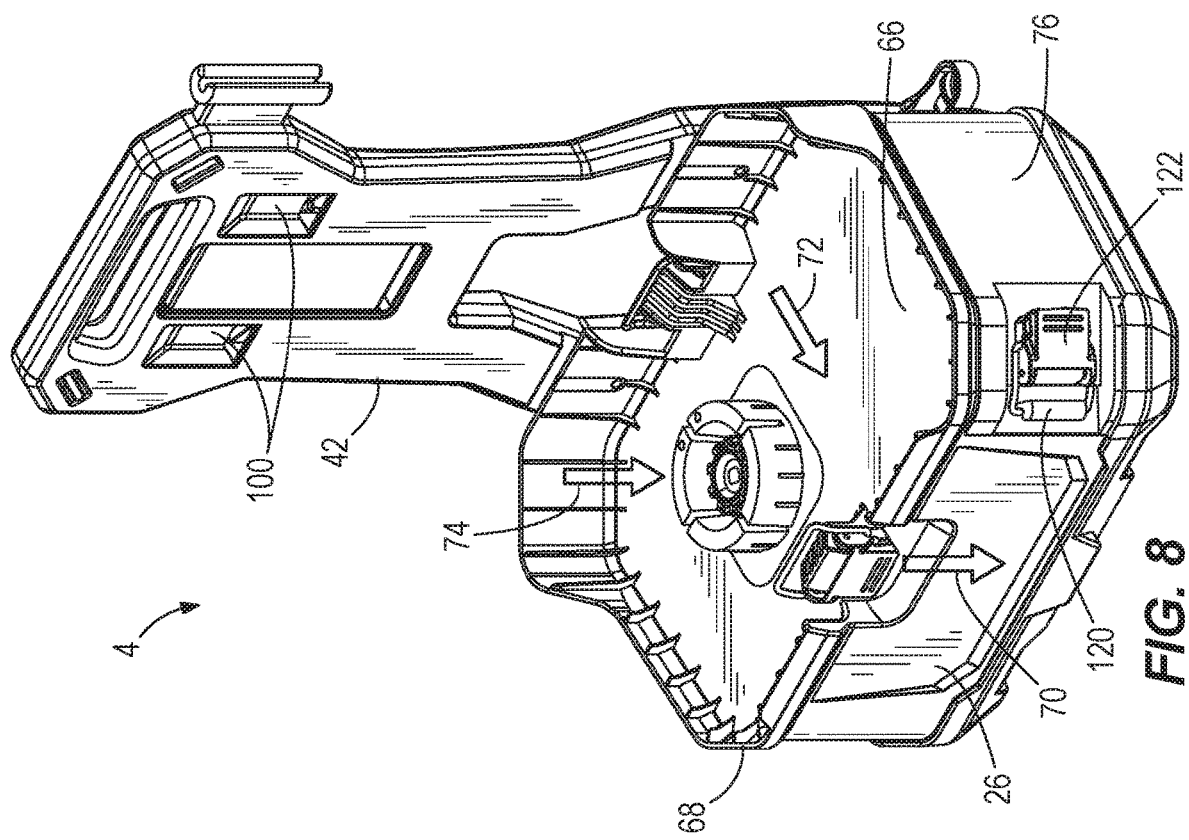
FIG. 8 is a perspective view of the power unit of the powered sprayer of FIG. 1.

With continued reference to FIG. 8, a gap 70 interrupts the peripheral wall 68 at the front of the base 26. A drainage flow path 74 extends from the base mating surface 66 through the gap 70, and then downward toward the ground. In some embodiments, the drainage flow path 74 may additionally or alternatively extend from the base mating surface 66 through a second gap (not shown) proximate the rear of the base 26. The gap 70 prevents any spilled working liquid (e.g., pesticides, herbicides, etc.) from collecting and pooling in the base mating surface 66, which otherwise could pose a hazard to the user and/or damage components supported on the base mating surface 66. The drainage flow path 74 further directs the flow of spilled working liquid away from a door 76 (FIG. 16) covering an opening 78 (FIG. 15) into the base compartment 28, to ensure that the spilled liquid does not enter into the base compartment 28.

Figure 9:
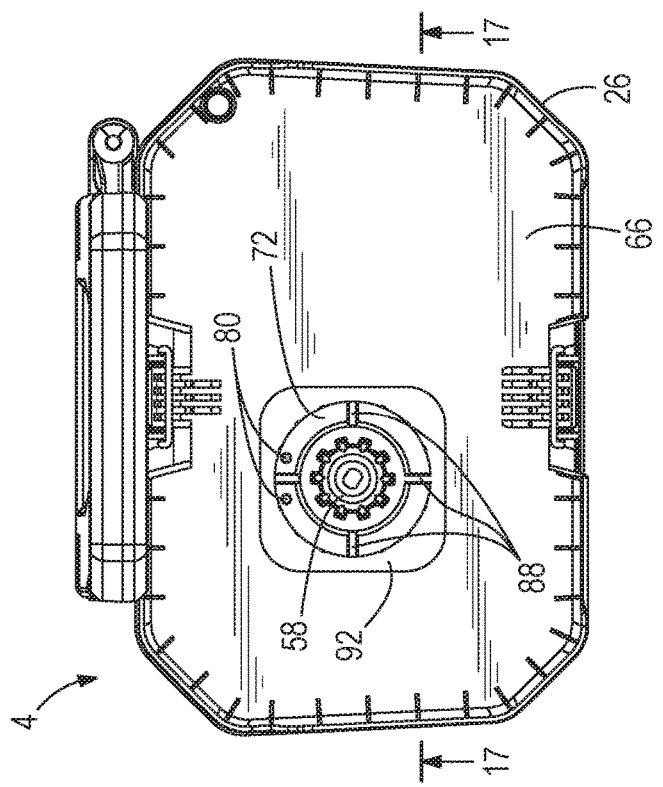
FIG. 9 is a top view of the power unit of the powered sprayer of FIG. 1.
Figure 25:
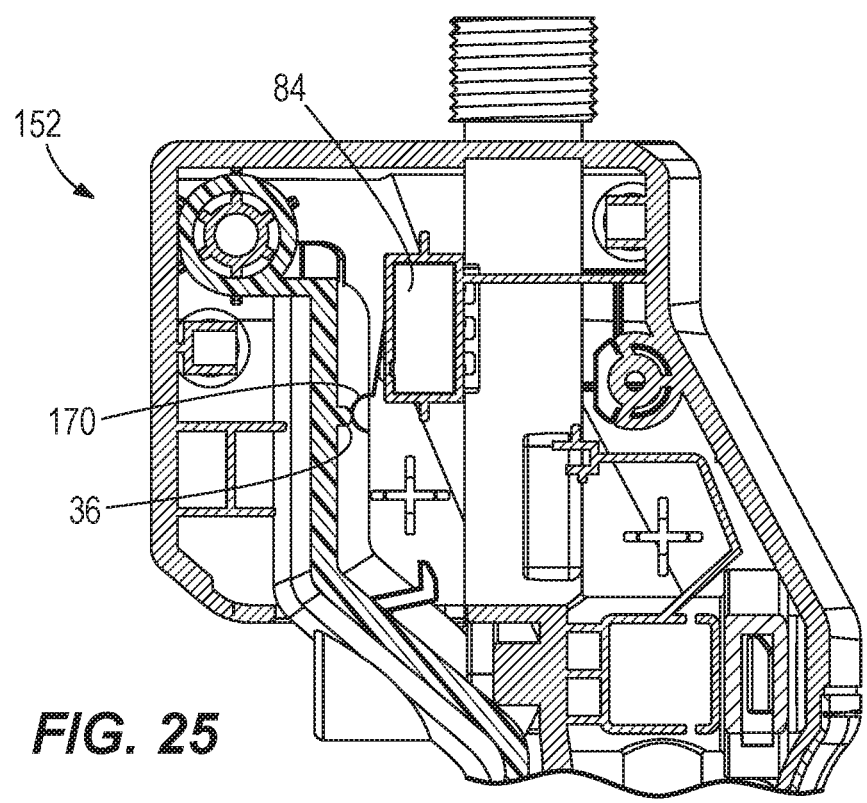
FIG. 25 is a cross-sectional view of the wand handle of the powered sprayer of FIG. 1, taken along line 25-25 of FIG. 21 and illustrating the trigger in an extended position.

With reference to FIG. 9, the base further includes an annular rib 72 axially projecting upward from the mating surface 66. The annular rib 72 supports a pair of base electrical contacts 80 that engage a pair of micro switch electrical contacts 82 (FIG. 19) supported in the tank mating surface 64 when the sprayer tank 2 is coupled to the power unit 4. The electrical contacts 80, 82 electrically connect the PCBA 34 (FIG. 17) with a micro switch 84 (FIG. 25) located in the wand 10. As will be discussed in more detail below, the micro switch 84 is operable to activate and deactivate the motor 30 to pump liquid from the tank compartment 8 to the wand 10 and out a nozzle 86 (FIG. 2).

The base mating surface 66 also includes base slots 88 transecting the annular rib 72 (FIG. 10). The base slots 88 receive corresponding tank ridges 90 (FIG. 19) protruding from the tank mating surface 64 when the sprayer tank 2 is inserted into the power unit 4. The base slots 88 and tank ridges 90 ensure that the sprayer tank 2 and power unit 4 are properly oriented and aligned relative to each other during coupling, so that the interface couplings 56, 58 properly engage for co-rotation, the base electrical contacts 80 properly engage the micro switch electrical contacts 82, and the tank latches 38 can be coupled to the reservoir tank catches 40.

The sprayer tank 2 further includes a pair of tank catches 102 (FIG. 18) that engage a pair of frame recesses 100 (FIG. 8) when the sprayer tank 2 is coupled to the power unit 4. The tank catches 102 and frame recesses 100 cooperate with the tank latches and catches 38, 40 to secure the sprayer tank 2 to the power unit 4.

Figure 23:
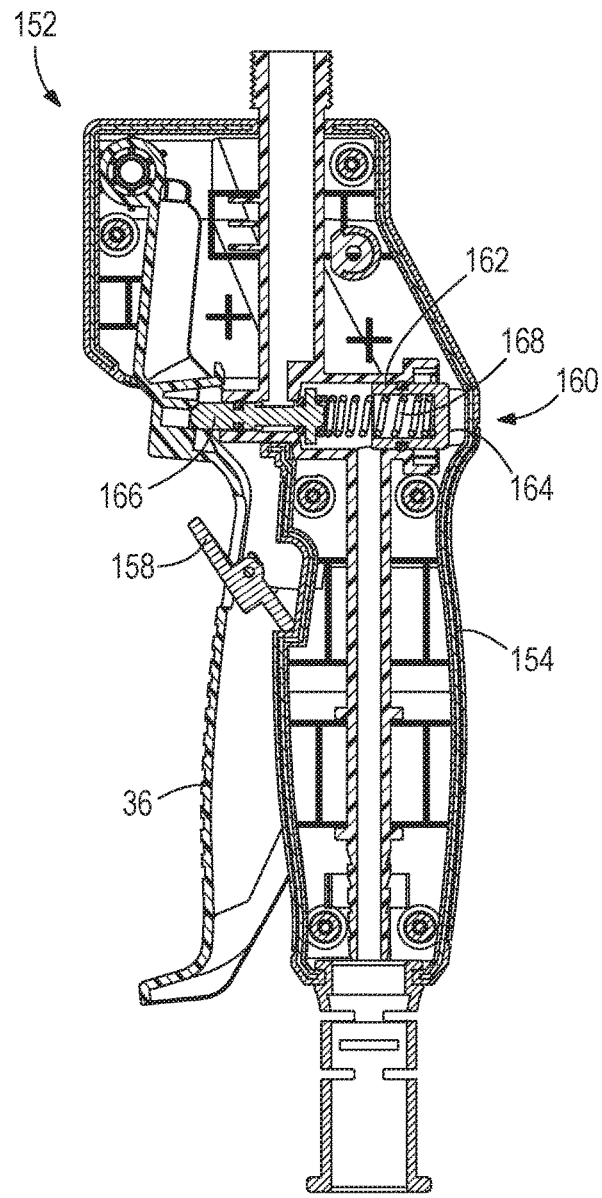
FIG. 23 is a cross-sectional view of the wand handle of the powered sprayer of FIG. 1, taken along line 23-23 of FIG. 21 and illustrating a trigger in an extended position.
Figure 27:
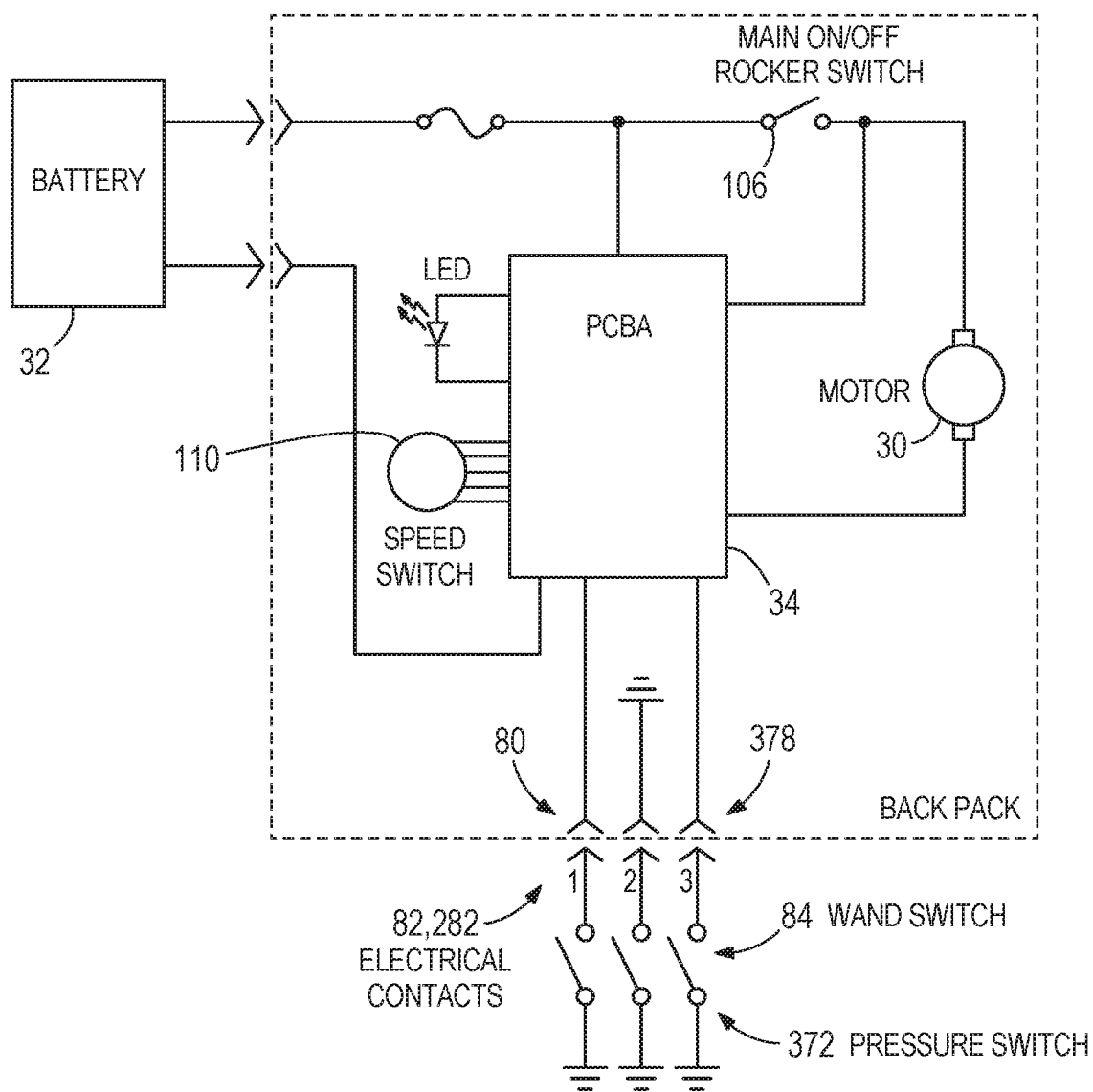
FIG. 27 is a schematic view of a wiring diagram for the powered sprayer of FIG. 1.
Figure 28:
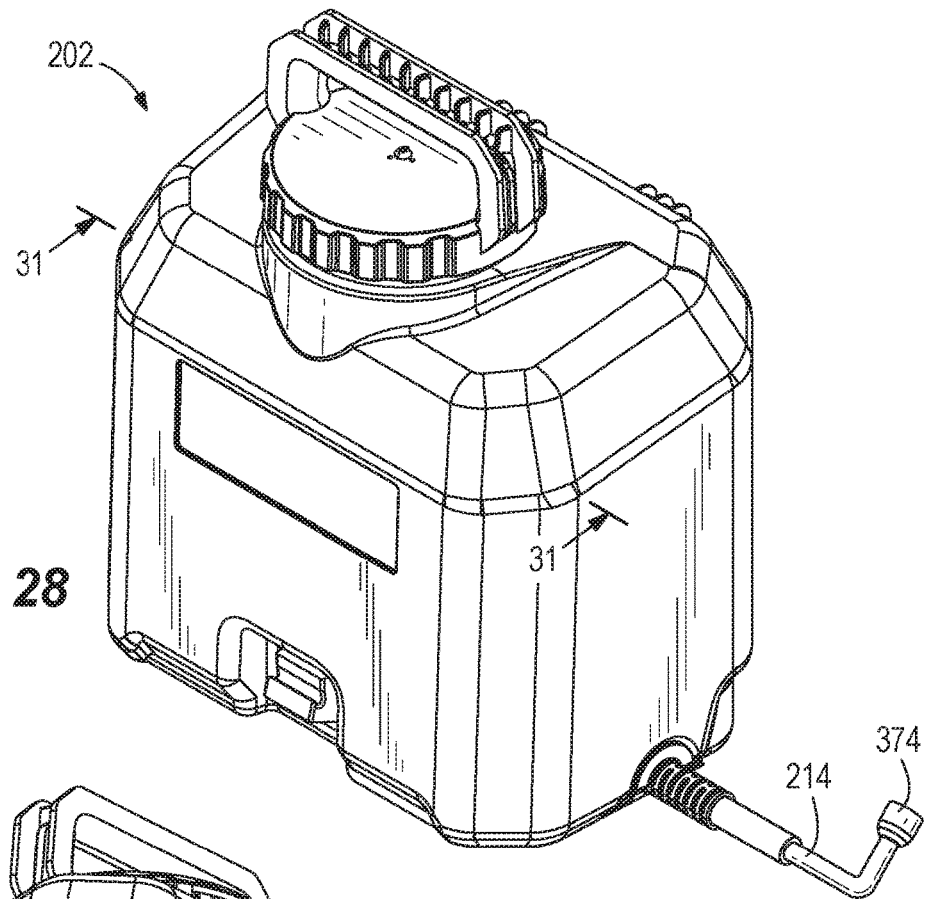
FIG. 28 is a top perspective view of a water tank operable with the powered sprayer of FIG. 1.
Figure 29:
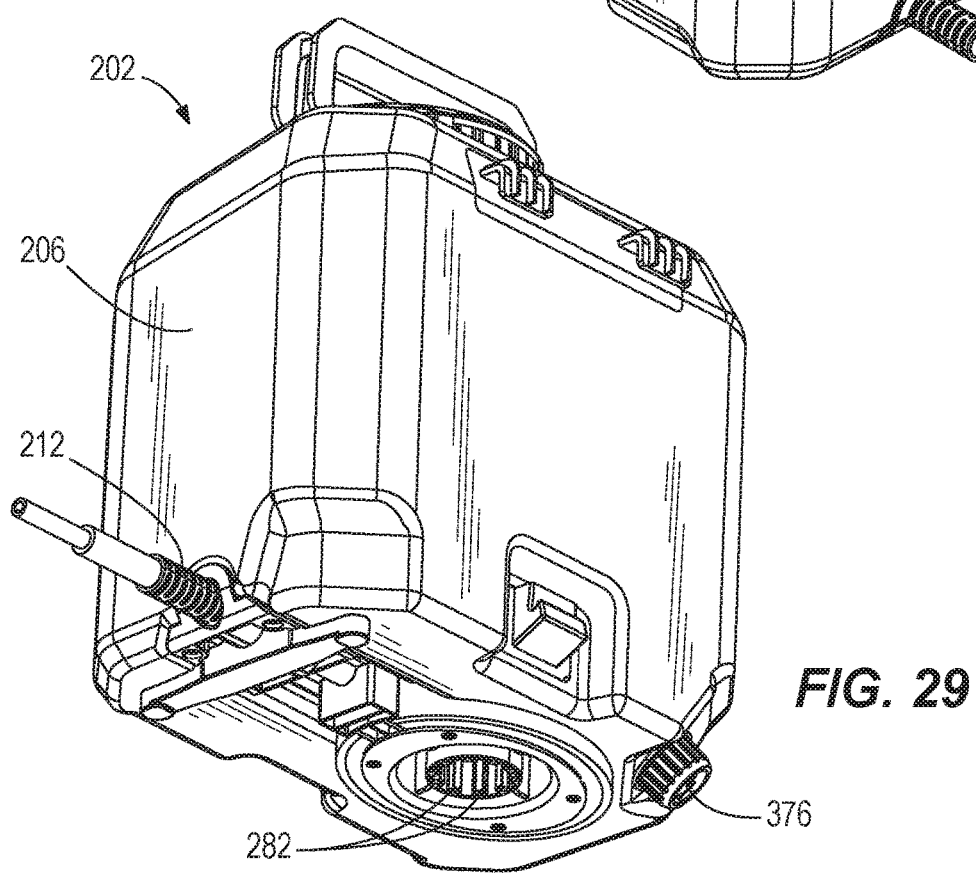
FIG. 29 is a bottom perspective view of the water tank of FIG. 28.
Figure 30:
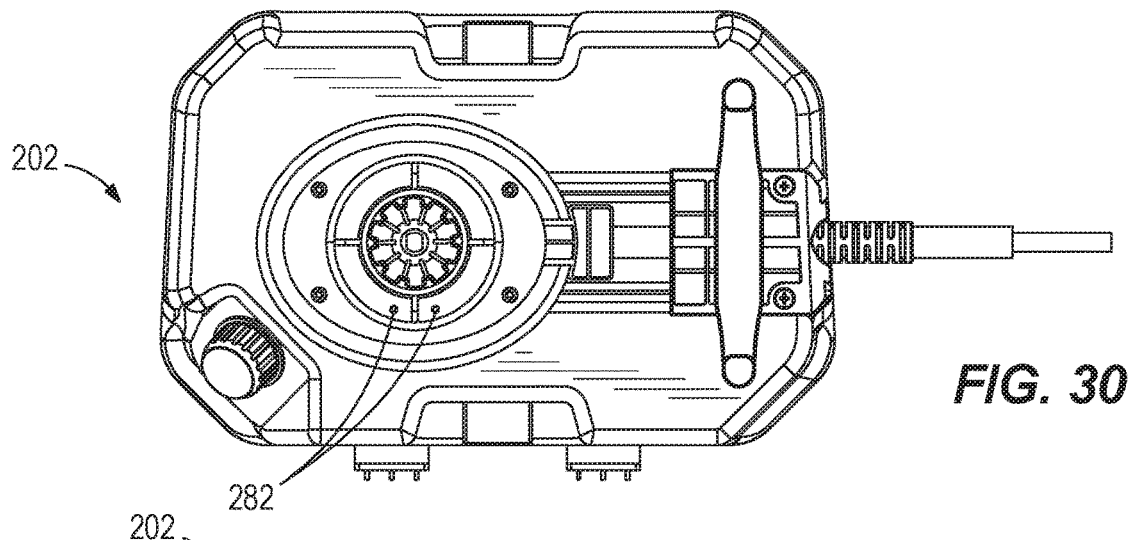
FIG. 30 is a bottom view of the water tank of FIG. 28.
Figure 31:
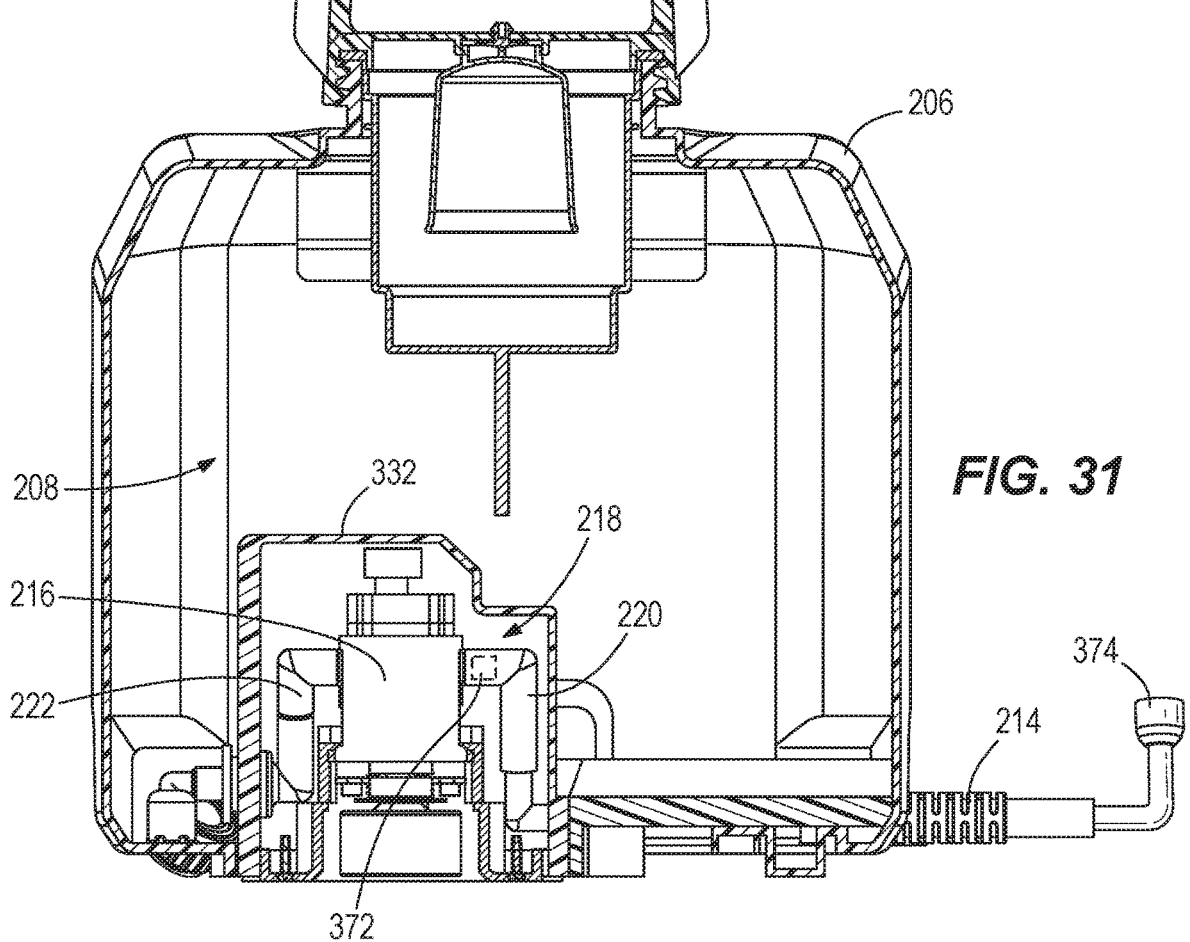
FIG. 31 is a cross-sectional view of the water tank of FIG. 28, taken along line 31-31 of FIG. 28.
Figure 32:
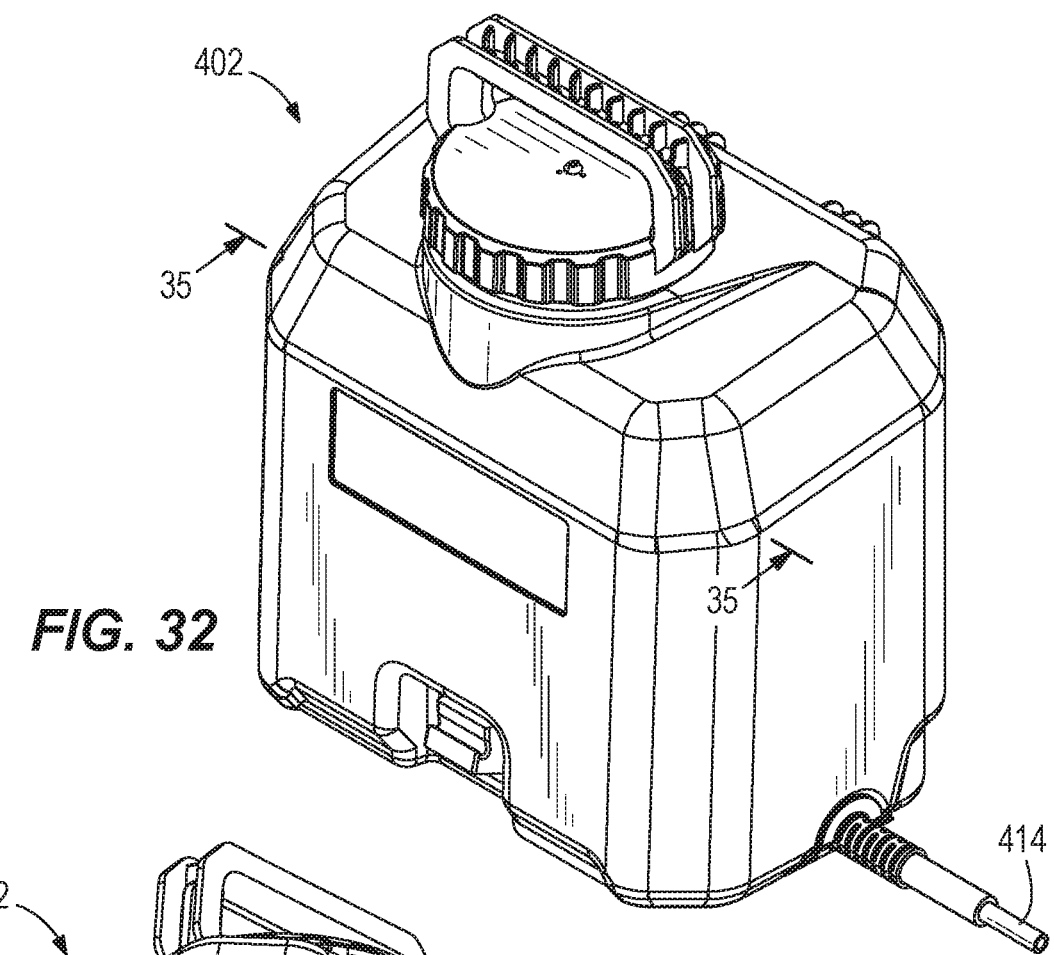
FIG. 32 is a top perspective view of a concrete chemical tank operable with the powered sprayer of FIG. 1.
Figure 33:
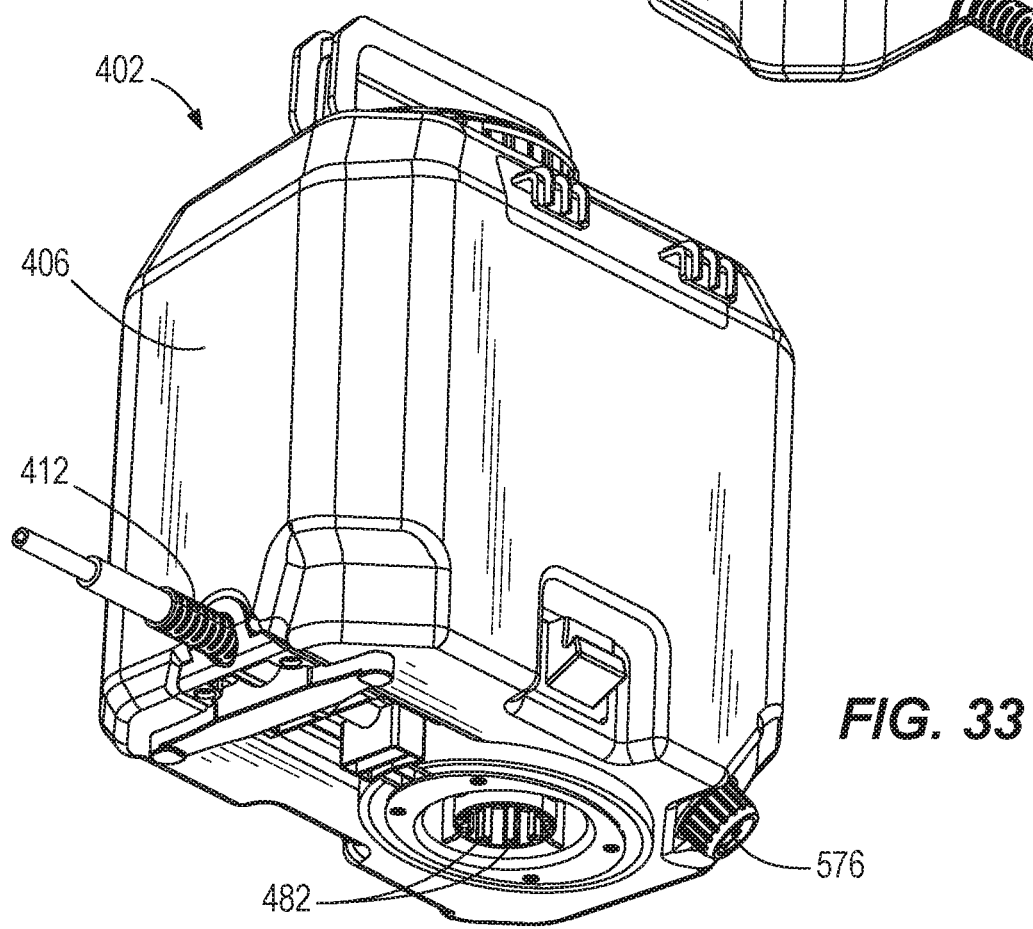
FIG. 33 is a bottom perspective view of the concrete chemical tank of FIG. 32.
Figure 34:
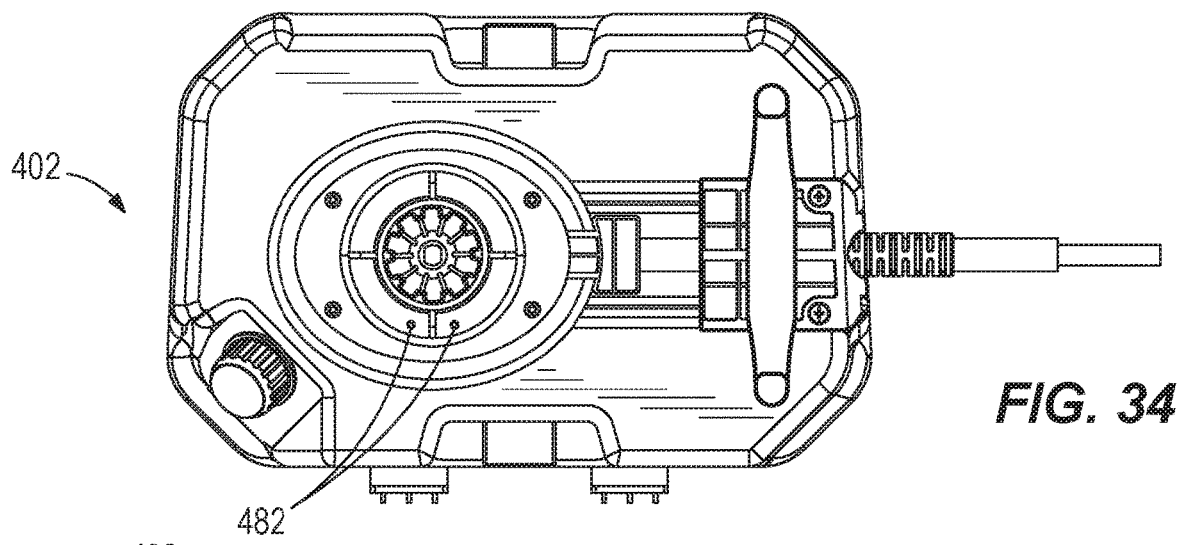
FIG. 34 is a bottom view of the concrete chemical tank of FIG. 32.
Figure 35:
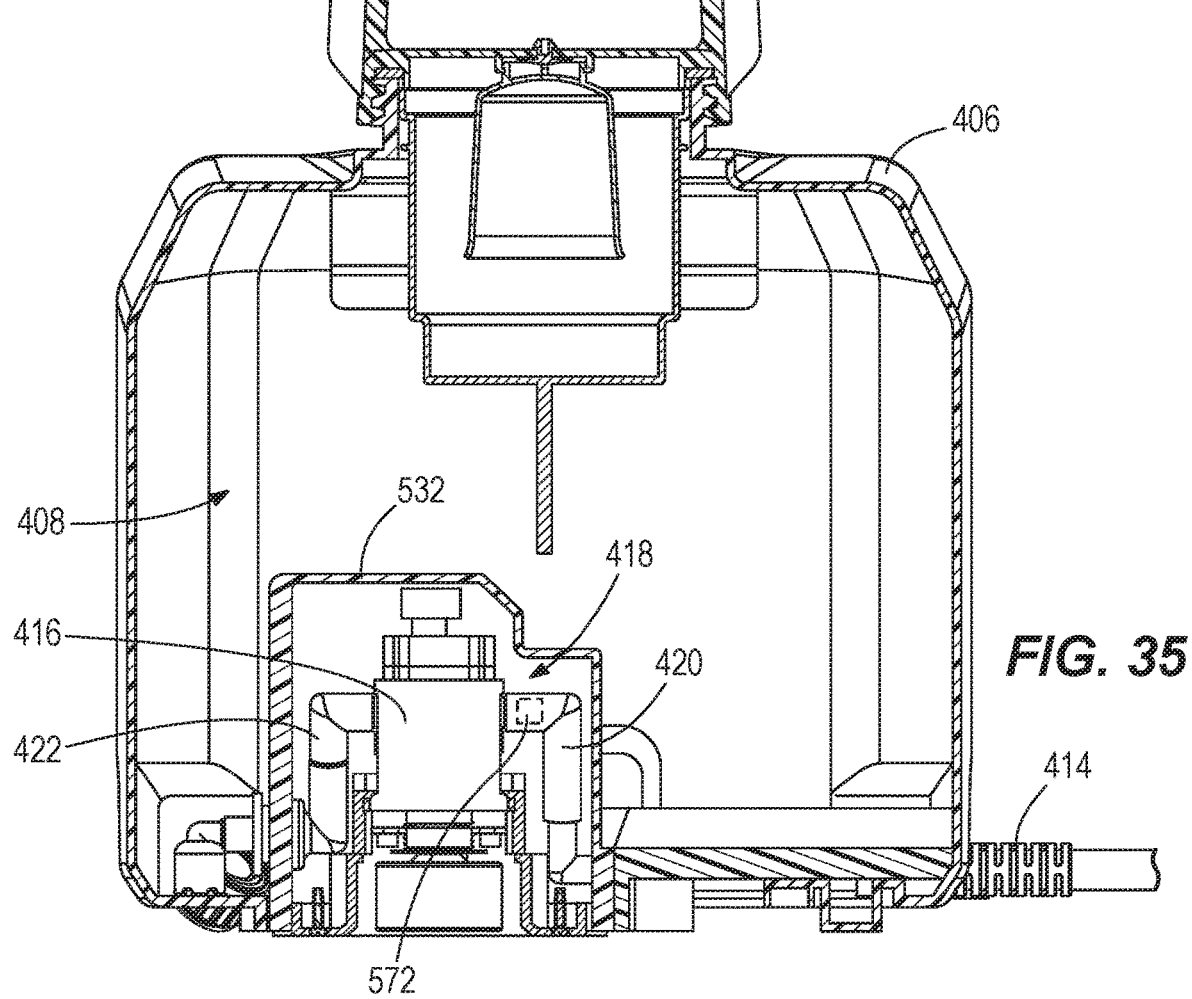
FIG. 35 is a cross-sectional view of the concrete chemical tank of FIG. 32, taken along line 35-35 of FIG. 32.
Figure 37:
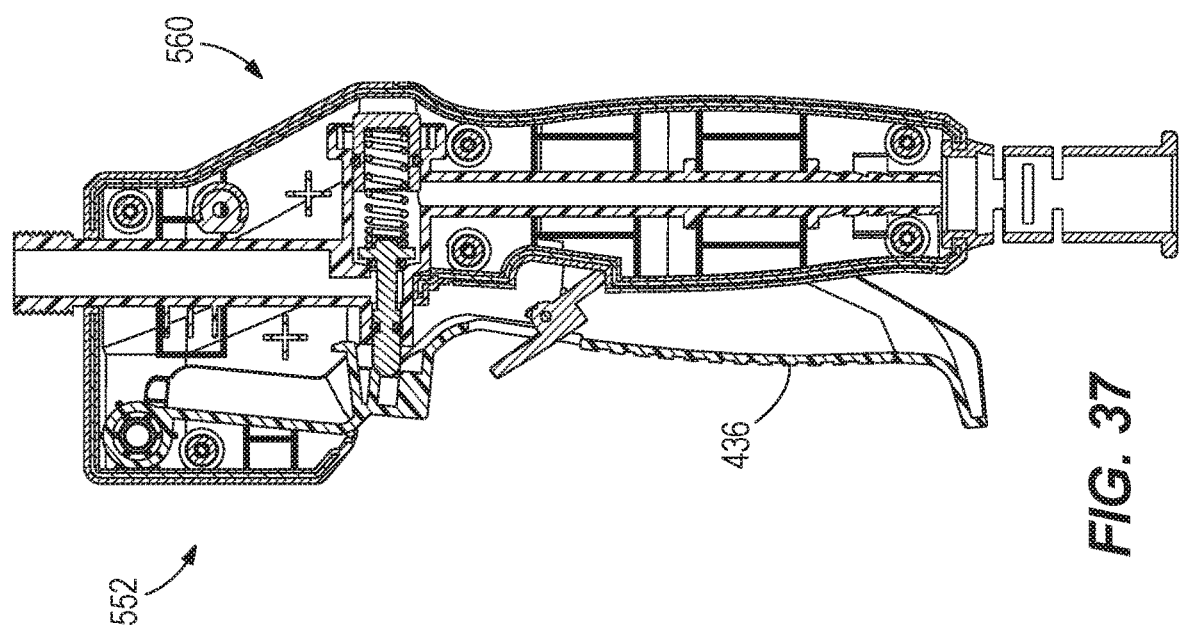
FIG. 37 is a cross-sectional view of the wand of the concrete chemical tank of FIG. 32, taken along line 37-37 of FIG. 36.

FIGS. 12 and 13 illustrate a recessed control panel 104 supporting a rocker switch 106 and an adjustable dial 108. The rocker switch 106 is operable to electrically connect the battery pack 32 with the PCBA 34 and the motor 30, and thus functions as a main on/off switch. However, activation and deactivation of the motor 30 is controlled by the micro switch 84 (FIG. 23) located in the wand 10. In other embodiments, in lieu of the rocker switch 106 on the control panel 104, the wand 10 may include a main switch (not shown) operable to electrically connect the battery pack 32 with the PCBA 34 and the motor 30. The dial 108 actuates a speed switch 110 (FIG. 27) operable to regulate the voltage supplied to the motor 30, in order to regulate the pressure and/or the flow rate of the liquid ejected from the nozzle 86 during operation of the sprayer 1. For example, in the illustrated embodiment, the dial 108 and corresponding speed switch 110 are adjustable between five different operational positions, so that five different voltages (i.e., corresponding to five different motor speeds) may be supplied to the motor 30 which vary between a first, lowest voltage and a fifth, highest voltage. In other embodiments, the dial 108 may be adjustable between fewer or more than five positions and corresponding voltages.

With reference to FIGS. 15 and 16, the door 76 cooperates with the base 26 to cover the opening 78 and is pivotable about a hinge 114 between opened and closed positions. A lip 116 on the base 26 circumscribes the opening 78 and supports a seal 118 that cooperates with the door 76 to seal off the base compartment 28 when the door 76 is closed. When closed, the seal 118 prevents the working liquid from entering into the base compartment 28, thereby protecting the battery pack 32 and any other internal components contained therein. A door catch 120 (FIG. 8) protrudes from the base 26 adjacent the opening 78 and opposite the hinges 114, the door catch 120 cooperating with a door latch 122 (FIG. 8) on the door 76 to releasably secure the door 76 in the closed position.

FIGS. 16 and 17 illustrate the base compartment 28 within the base 26 that contains therein the motor 30, a battery pack receptacle 124, the PCBA 34, and various other internal components of the power unit 4. The receptacle 124 receives and supports the battery pack 32, and includes battery terminals (not shown) to electrically connect the battery pack 32 to the PCBA 34.

Figure 18:
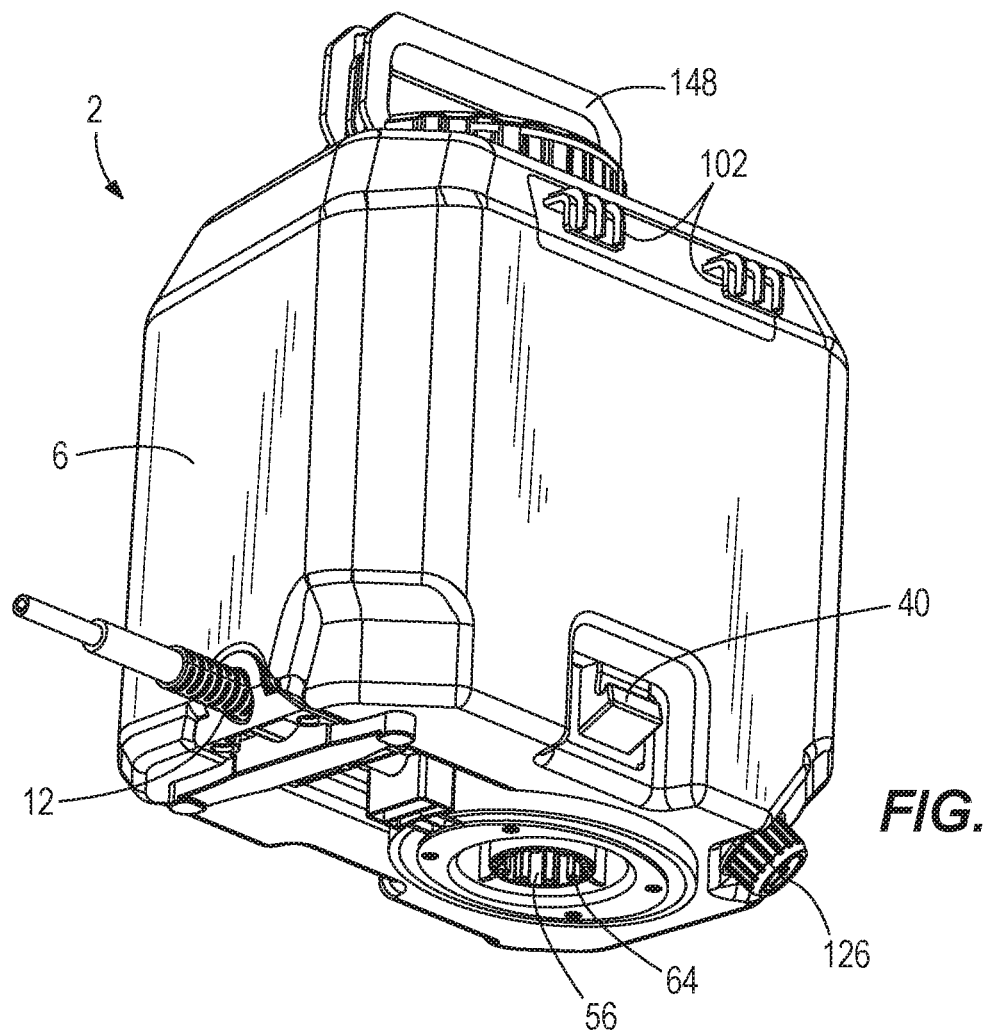
FIG. 18 is a bottom perspective view of the sprayer tank of the powered sprayer of FIG. 1.
Figure 19:
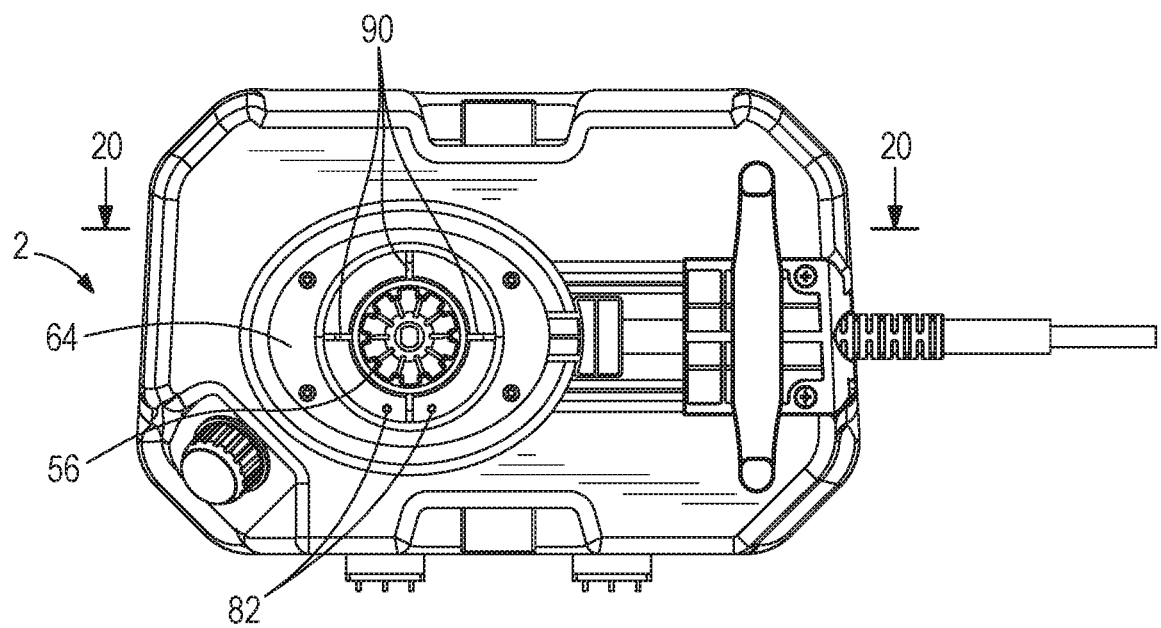
FIG. 19 is a bottom view of the sprayer tank of the powered sprayer of FIG. 1.

FIGS. 18-20 further illustrate the sprayer tank 2 of the sprayer 1. The sprayer tank 2 includes a tank drain 126 to dispose of remaining liquid from the tank compartment 8 after use. Wires (not shown) extend through the hose 14 and electrically connect the micro switch 84 (FIG. 25) to the micro switch electrical contacts 82.

With reference to FIG. 20, an internal pump wall 132 separates and fluidly isolates the pump compartment 18 from the tank compartment 8. As such, the working liquid contained in the tank compartment 8 cannot enter into the pump compartment 18 except by entering through the inlet 22, passing through the pump 16, and proceeding through the outlet 20 and into the hose 14.

A lid 134 and a filter assembly 136 connect with the reservoir 6 adjacent a filling opening 138. The lid 134 connects with the reservoir 6 to cover the filling opening 138. The filter assembly 136 includes a filter 140 and an annular shoulder 142 connected with the filter and/or supported by a threaded boss 144 that surrounds the filling opening 138. The filter 140 filters liquid prior to entering into the tank compartment 8 of the reservoir 6. An air vent 146 can also be provided in the lid 134. A lid handle 148 protrudes from the lid 134 and is graspable by a user to lift and carry the sprayer tank 2.

Figure 24:
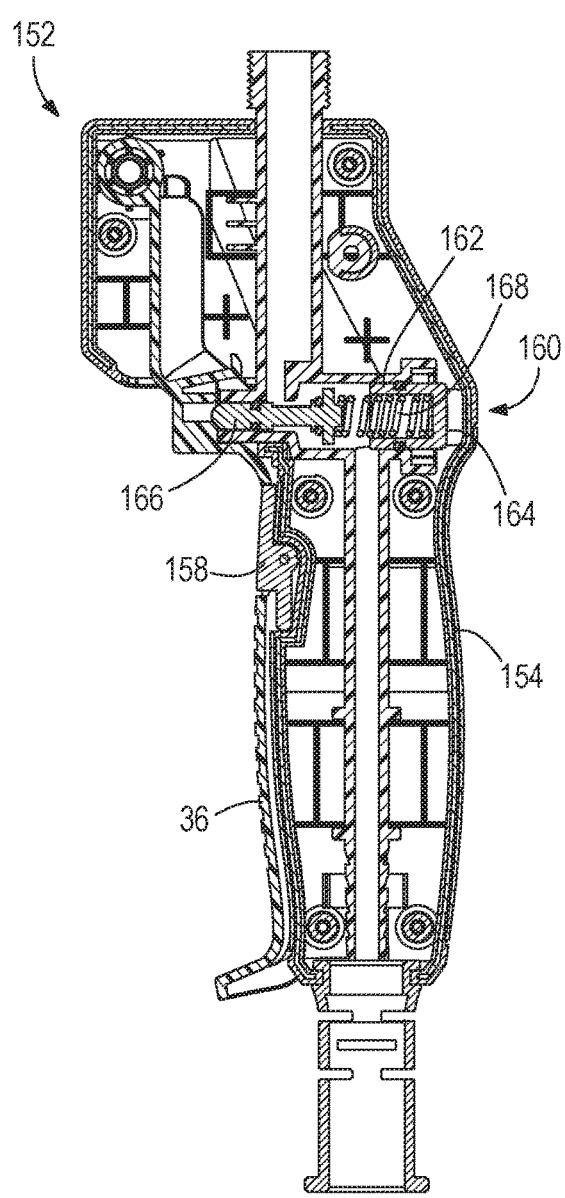
FIG. 24 is a cross-sectional view of the wand handle of the powered sprayer of FIG. 1, taken along line 23-23 of FIG. 21 and illustrating the trigger in a depressed position.

With reference to FIGS. 2 and 21-24, the wand 10 includes the nozzle 86, a wand handle 152 having a handle body 154, and a tube 156 extending between and fluidly connecting the wand handle 152 to the nozzle 86. The trigger 36 is pivotably coupled to the handle body 154 and movable between an extended position (FIG. 23) and a pressed position (FIG. 24). A lock-out 158 is coupled to the handle 36 and pivotable between a locked position (FIG. 23) and an unlocked position (FIG. 24). The lock-out 158 selectively engages a recess in the handle body 154 to selectively lock the trigger 36 in the extended position. The trigger lock-out 158 must be actuated first before the trigger 36 may be pivoted from the extended position to the pressed position.

Figure 26:
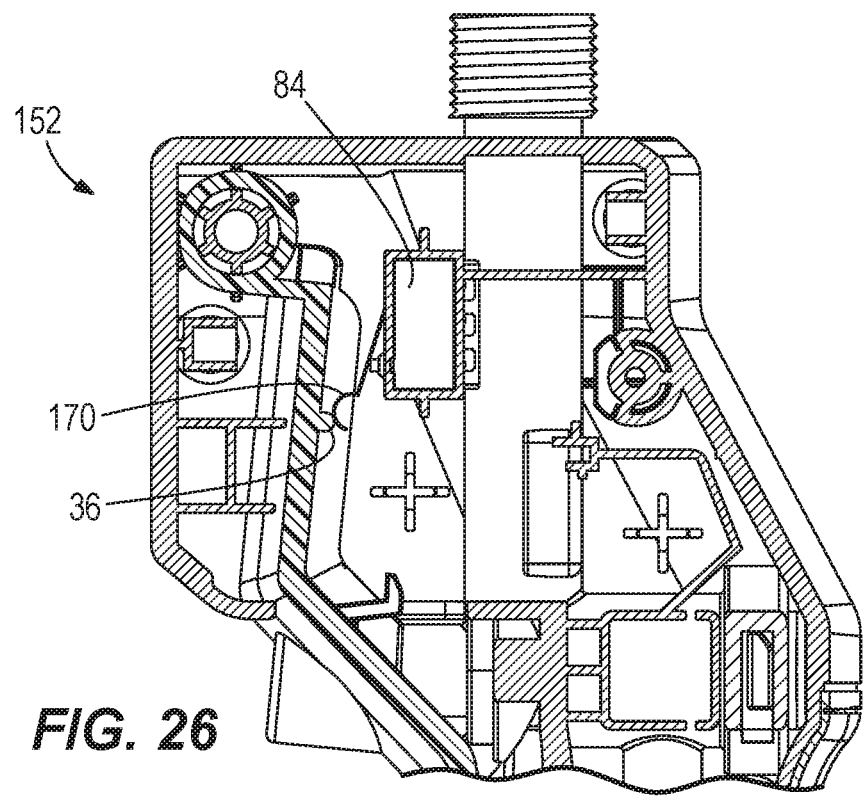
FIG. 26 is a cross-sectional view of the wand handle of the powered sprayer of FIG. 1, taken along line 25-25 of FIG. 21 and illustrating the trigger in a depressed position.

The wand handle 152 also includes a mechanical valve assembly 160 having a valve bore 162, a stopper 164, a plunger 166 extending within the valve bore 162 between the trigger 36 and the stopper 164, and a spring 168 biasing the plunger 166 toward the trigger 36. The micro switch 84 (FIGS. 25 and 26) is also located within the wand handle 152 and includes a lever 170 that engages the trigger 36 to mechanically amplify a distance traveled by the trigger 36 when actuating the micro switch 84. As discussed above, when the sprayer tank 2 is coupled to the power unit 4, the micro switch 84 is electrically connected to the PCBA 34 (FIG. 17) via wires (not shown) extending through the hose 14, and by the electrical contacts 80, 82 (FIGS. 10 and 11).

In operation, when the trigger 36 is pressed from the extended position toward the pressed position, the trigger 36 first actuates the plunger 166 to open the mechanical valve assembly 160 and fluidly connect the hose 14 with the nozzle 86. As the trigger 36 continues toward the pressed position, the trigger 36 subsequently engages the lever 170 and actuates the micro switch 84 (FIG. 25) to activate the motor 30 and begin pumping liquid from the tank compartment 8 out the nozzle 86. The mechanical valve assembly 160 opens before the micro switch 84 activates the motor 30, which prevents the pump 16 from building pressure in the hose 14 and thus prevents any undesirable burst or overspray of liquid during operation of the sprayer 1.

Similarly, when the trigger 36 is released from the pressed position toward the extended position, the trigger 36 first disengages the lever 170 to open the micro switch 84 (FIG. 26), and then disengages the plunger 166 to close the mechanical valve assembly 160. This ensures that the motor 30 is deactivated and the pump 16 stops pumping liquid before the valve assembly 160 closes and thereby prevents pressure from building within the hose 14.

FIGS. 28-31 illustrate a water tank 202 similar to the sprayer tank 2 described above, with like features shown with reference numerals in the 200-300 range of numbering. The water tank 202 connects to and operates with the power unit 4 in a manner similar to that of sprayer tank 2. The illustrated water tank 202 is operable to supply water to a tool (not shown) (e.g., for concrete cutting, etc.). For example, the hose 214 (with the wand 210 detached) could be attached to the tool (e.g., a concrete saw, a core drill, etc.) to supply water to the working element (e.g., a saw blade, a core bit, etc.) driven by the tool, via an on-board tool valve on the tool (e.g., for dust abatement and/or cooling). In such a case, the motor 30 may activate as described below in response to the user opening the tool valve. The water tank 202 may further include a quick-disconnect fitting 374 at the end of the hose 214 for quick connection and disconnection with the tool.

The water tank 202 includes a pair of pressure switch electrical contacts 282 that engage and electrically connect to the base electrical contacts 80 when the water tank 202 is attached to the power unit 4. The contacts 282 are electrically connected with a pressure switch 372 (e.g., a spring-loaded pressure switch) which detects the fluid pressure in the outlet 220 of the pump 216. When the water tank 202 is attached to the power unit 4, the contacts 80, 282 electrically connect the pressure switch 372 to the PCBA 34. Below a first predetermined detected pressure threshold, the motor 30 is activated to drive the pump 216, pressurizing liquid drawn from the tank compartment 208 and discharging the pressurized liquid from the hose 214 to supply to the tool. The pump 216 continues in the "on" state until the user closes the tool valve, which stops the flow of liquid to the tool, causing the fluid pressure to increase in the outlet 220. Once the fluid pressure reaches a second predetermined detected pressure threshold, the pressure switch 372 opens, deactivating the motor 30 and the pump 216. Upon opening the tool valve again, fluid pressure in the outlet 220 will drop below the first predetermined detected pressure threshold, reactivating the motor 30 to drive the pump 216 once again.

Figure 36:
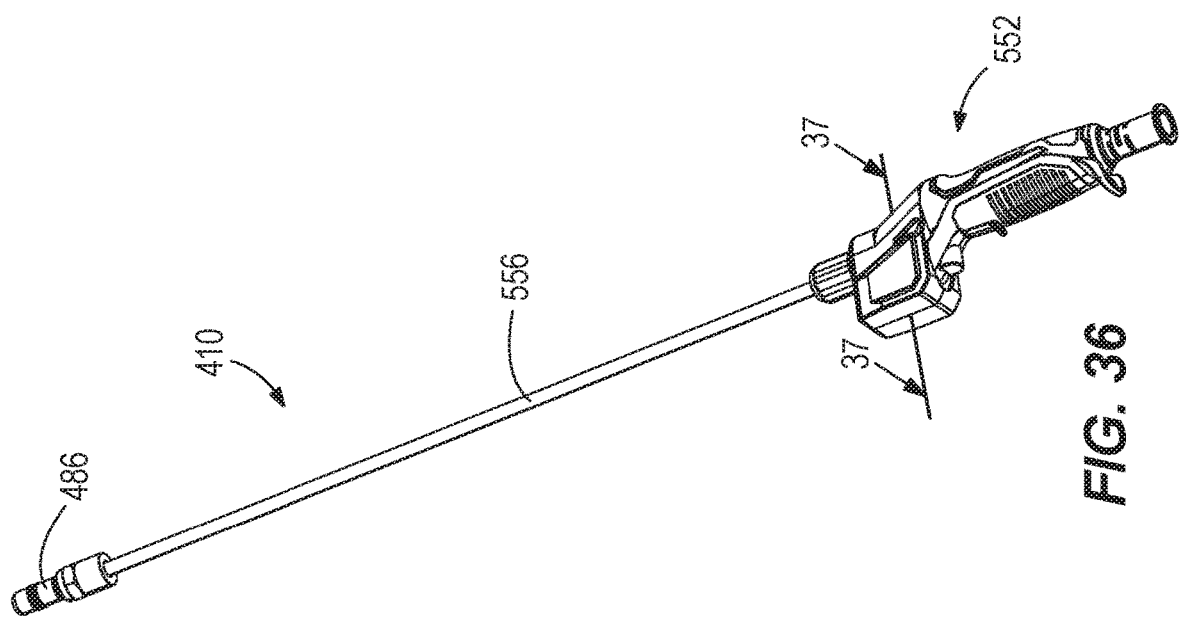
FIG. 36 is a perspective view of a wand of the concrete chemical tank of FIG. 32.

FIGS. 32-37 illustrate a concrete chemical tank 402 similar to the sprayer tank 2 and water tank 202 described above, with like features shown with reference numerals in the 400-500 range of numbering. The illustrated concrete chemical tank 402 is operable to supply concrete chemicals (e.g., curing and sealing chemicals, etcher, form oil, muriatic acid, etc.) to concrete (e.g., for concrete curing, etching, sealing, etc.). The concrete chemical tank 402 connects to and operates with the power unit 4 in a manner similar to that of water tank 202. However, the concrete chemical tank 402 includes a wand 410 (FIG. 36). The wand 410 includes a mechanical valve assembly 560 but does not include a micro switch (e.g., such as the micro switch 84 of the wand 10).

The concrete chemical tank 402 includes a pair of pressure switch electrical contacts 482 that engage and electrically connect to the base electrical contacts 80 when the concrete chemical tank 402 is attached to the power unit 4. The contacts 482 are electrically connected with a pressure switch 572 (e.g., a spring-loaded pressure switch) which detects the fluid pressure in the outlet 420 of the pump 416. When the concrete chemical tank 402 is attached to the power unit 4, the contacts 80, 482 electrically connect the pressure switch 572 to the PCBA 34. Below a first predetermined detected pressure threshold, the motor 30 is activated to drive the pump 416, pressurizing liquid drawn from the tank compartment 408 and discharging the pressurized liquid wand 410 when the wand handle 552 is depressed to open the valve assembly 560. The pump 416 continues in the "on" state until the user releases the wand handle 552, which closes the valve assembly 560 and stops the flow of liquid to the wand 410, causing the fluid pressure to increase in the outlet 420. Once the fluid pressure reaches a second predetermined detected pressure threshold, the pressure switch 572 opens, deactivating the motor 30 and the pump 416. Upon opening the valve assembly 560 again, fluid pressure in the outlet 420 will drop below the first predetermined detected pressure threshold, reactivating the motor 30 to drive the pump 416 once again.

Because the pumps 16, 216, 416 remain with each sprayer tank 2, water tank 202, and concrete chemical tank 402, respectively, the same power unit 4 may be used with different sprayer tanks 2 holding different chemicals, or with different water tanks 202, or with different concrete chemical tanks 402, while avoiding cross-contamination. Furthermore, the sprayer tank 2, water tank 202, and concrete chemical tank 402 may include multiple different interchangeable wands 10, 210, 410, and/or hoses 14, 214, 414, specifically configured for use with different applications (e.g., chemical spraying, water supply for concrete cutting, chemical supply for concrete working, etc.). In further embodiments, the water tank 202 also includes a secondary drain fitting 376 (FIG. 29) connectable to a garden hose for gravity feed operation of the water tank 202 with the tool.

In the illustrated embodiment, the power unit 4 includes a single control line (not shown) operable to control each of the sprayer tank 2, the water tank 202, and the concrete chemical tank 402 via a single controller (not shown) included with the PCBA 34. Moreover, the pair of base contacts 80 are configured to interface with each of the micro switch contacts 82 and the pressure switch contacts 282, 482. In other embodiments, such as the embodiment shown in FIG. 27, the power unit 4 alternatively includes first and second control lines, the first control line operable to control the sprayer tank 2 via a first controller (not shown) included with the PCBA 34, and the second control line operable to control the water tank 202 and the concrete chemical tank 402 via a second controller included with the PCBA 34. In further embodiments, the first and second control lines are operable to separately control the sprayer tank 2 and the water and concrete chemical tanks 202, 402 via a single controller employing two separate control algorithms. Additionally, in the embodiment shown in FIG. 27, the base electrical contacts 80 are first base electrical contacts 80 that only engage the micro switch electrical contacts 82 of the sprayer tank 2, and the power unit 4 further includes second base electrical contacts 378 that only engage the pressure switch electrical contacts 282, 482 of the water and concrete chemical tanks 202, 402. The separate contacts 80, 378 identify what tank 2, 202, 402 is connected to the power unit 4.

Various features of the invention are set forth in the following claims.

What is claimed is:

1. A portable, battery-powered liquid sprayer for ejecting liquids, the sprayer comprising:
   a power unit including a base having a motor housed therein, a controller electrically connected to the motor, and a plurality of base electrical contacts electrically connected to the controller;
   a sprayer tank including a reservoir, an outlet fluidly connected with the reservoir, a pump fluidly connected with the reservoir and the outlet, a switch, and a plurality of switch electrical contacts electrically connected to the switch, the sprayer tank being configured for selective engagement with the power unit;
   wherein when the sprayer tank engages the power unit, the switch electrical contacts engage the base electrical contacts to form an electrical connection therebetween, and the motor is operable to selectively drive the pump to pump liquid from the reservoir for ejection through the outlet; and
   wherein when the sprayer tank disengages from the power unit, the switch electrical contacts disengage from the base electrical contacts.

2. The sprayer of claim 1, wherein the sprayer tank further includes a wand fluidly connected with the reservoir, and wherein the outlet comprises a nozzle located on the wand.

3. The sprayer of claim 2, wherein the wand includes the switch, and wherein the switch comprises a micro switch configured to selectively activate the motor.

4. The sprayer of claim 3, wherein the switch electrical contacts engage the base electrical contacts to electrically connect the micro switch with the controller when the sprayer tank engages the power unit.

5. The sprayer of claim 1, wherein the sprayer tank further includes a hose fluidly connected with the reservoir, and wherein the outlet comprises a quick-disconnect located on the hose.

6. The sprayer of claim 1, wherein the switch comprises a pressure switch configured to selectively activate the motor.

7. The sprayer of claim 6, wherein:
   the switch electrical contacts engage the base electrical contacts to electrically connect the pressure switch with the controller when the sprayer tank engages the power unit;
   the controller is configured to activate the motor when a liquid pressure detected by the pressure switch is less than a predetermined pressure threshold; and
   the controller is configured to deactivate the motor when the liquid pressure detected by the pressure switch is equal to or greater than the predetermined pressure threshold.

8. The sprayer of claim 1, wherein:
   the base includes a base mating surface circumscribed by a peripheral wall, the base mating surface being configured to mate with a tank mating surface of the sprayer tank when the sprayer tank engages the base; and
   the peripheral wall includes a gap that permits spilled liquid to drain from the base mating surface.

9. The sprayer of claim 1, wherein:
   the sprayer tank includes a first coupling coupled to the pump;
   the power unit includes a second coupling coupled to the motor; and
   wherein the first coupling engages the second coupling to permit torque to be transferred from the motor to the pump when the sprayer tank engages the power unit.

10. The sprayer of claim 1, wherein:
    the sprayer tank further comprises a wand including
       a mechanical valve in fluid communication with the pump, the mechanical valve configured to inhibit the flow of liquid when closed and to permit the flow of liquid when open;
       the switch, wherein the switch comprises a micro switch configured to selectively activate the motor, the motor being activated when the micro switch is closed and being deactivated when the micro switch is open; and an actuator operable to actuate the mechanical valve and the micro switch.

11. The sprayer of claim 10, wherein:

the actuator is movable between a first position, a second position, and a third position;

wherein in the first position, the mechanical valve is closed such that the flow of liquid is inhibited by the mechanical valve, and the micro switch is open such that the motor is deactivated;

wherein in the second position, the mechanical valve is open such that the flow of liquid is permitted by the mechanical valve, and the micro switch is open such that the motor is deactivated; and wherein in the third position, the mechanical valve is open such that the flow of liquid is permitted by the mechanical valve, and the micro switch is closed such that the motor is activated.

12. A portable, battery-powered liquid sprayer for ejecting liquids, the sprayer comprising:

a power unit including a base, a frame, and straps coupled to the frame and configured to support the portable, battery-powered liquid sprayer on a user's shoulders; and a first sprayer tank and a second sprayer tank, each of the first and second sprayer tanks including a reservoir, an outlet fluidly connected with the reservoir, and a pump fluidly connected with the reservoir and the outlet;

wherein each of the first sprayer tank and the second sprayer tank is configured for selective engagement with the power unit;

wherein the power unit further includes a motor housed in the base;

wherein the motor is operable to selectively drive the pump to pump liquid from the fluid reservoir for ejection through the outlet when each of the first sprayer tank and the second sprayer tank engages the power unit;

wherein the first sprayer tank includes a micro switch configured to selectively activate the motor when the first sprayer tank engages the power unit, and wherein the second sprayer tank includes a pressure switch configured to selectively activate the motor when the second sprayer tank engages the power unit;

wherein the base includes a controller to which the motor is electrically connected and a plurality of base electrical contacts, the first sprayer tank includes a plurality of micro switch electrical contacts, and the second sprayer tank includes a plurality of pressure switch electrical contacts;

wherein when the first sprayer tank engages the power unit, the micro switch electrical contacts engage the base electrical contacts to electrically connect the micro switch with the controller, and when the first sprayer tank disengages from the power unit, the micro switch electrical contacts disengage from the base electrical contacts; and wherein when the second sprayer tank engages the power unit, the pressure switch electrical contacts engage the base electrical contacts to electrically connect the pressure switch with the controller, and when the second sprayer tank disengages from the power unit, the pressure switch electrical contacts disengage from the base electrical contacts.

13. A portable, battery-powered liquid sprayer for ejecting liquids, the sprayer comprising:

a reservoir;

a pump in fluid communication with the reservoir;

a motor operable to selectively drive the pump; and a wand in fluid communication with the pump, the wand including a mechanical valve in fluid communication with the pump, the mechanical valve being configured to inhibit the flow of liquid when closed and to permit the flow of liquid when open;

a switch configured to selectively activate the motor, the motor being activated when the switch is closed and being deactivated when the switch is open; and an actuator operable to actuate the mechanical valve and the switch, the actuator being movable between a first position, a second position, and a third position;

wherein in the first position, the mechanical valve is closed such that the flow of liquid is inhibited by the mechanical valve, and the switch is open such that the motor is deactivated;

wherein in the second position, the mechanical valve is open such that the flow of liquid is permitted by the mechanical valve, and the switch is open such that the motor is deactivated; and wherein in the third position, the mechanical valve is open such that the flow of liquid is permitted by the mechanical valve, and the switch is closed such that the motor is activated.

14. The sprayer of claim 13, wherein the actuator moves sequentially between the first position, the second position, and the third position.

15. The sprayer of claim 13, wherein the reservoir includes a tank compartment and a pump compartment fluidly isolated from the tank compartment, and wherein the pump is located in the pump compartment.

* * * * *